United States Patent
Joshi et al.

(10) Patent No.: US 10,848,765 B2
(45) Date of Patent: Nov. 24, 2020

(54) RATE/DISTORTION/RDCOST MODELING WITH MACHINE LEARNING

(71) Applicant: GOOGLE LLC, Mountain View, CA (US)

(72) Inventors: Urvang Joshi, Mountain View, CA (US); Debargha Mukherjee, Cupertino, CA (US); Hui Su, Sunnyvale, CA (US)

(73) Assignee: GOOGLE LLC, Mountain View, CA (US)

(*) Notice: Subject to any disclaimer, the term of this patent is extended or adjusted under 35 U.S.C. 154(b) by 93 days.

(21) Appl. No.: 16/266,662

(22) Filed: Feb. 4, 2019

(65) Prior Publication Data
US 2020/0186808 A1    Jun. 11, 2020

Related U.S. Application Data

(60) Provisional application No. 62/778,260, filed on Dec. 11, 2018.

(51) Int. Cl.
*H04N 19/147* (2014.01)
*H04N 19/124* (2014.01)
(Continued)

(52) U.S. Cl.
CPC ......... *H04N 19/147* (2014.11); *H04L 65/607* (2013.01); *H04N 19/124* (2014.11);
(Continued)

(58) Field of Classification Search
CPC ............ G06N 20/20; G06N 3/04; G06N 3/08; G06N 3/10; G06N 5/003; H04N 19/124;
(Continued)

(56) References Cited

U.S. PATENT DOCUMENTS 8,897,370 B1 * 11/2014 Wang ................ H04N 19/139
375/240.2
2013/0128963 A1    5/2013 Leontaris et al.
(Continued)

FOREIGN PATENT DOCUMENTS

CN    105791826 A    7/2016
KR    20170059040 A    5/2017

OTHER PUBLICATIONS

Fast mode selection scheme for H.264/AVC inter prediction based on statistical learning method Weiping Ma ; Shuyuan Yang ; Li Gao ; Chaoke Pei ; Shefeng Yan 2009 IEEE International Conference on Multimedia and Expo.*

(Continued)

*Primary Examiner* — Mohammed S Rahaman
(74) *Attorney, Agent, or Firm* — Young Basile Hanlon & MacFarlane, P.C.

(57) ABSTRACT

A method for encoding a block of a video stream includes generating, using pixel values of the block, block features for the block; for each candidate encoding mode of candidate encoding modes, generating, using the block features and the each candidate encoding mode as inputs to a machine-learning module, a respective encoding cost; selecting, based on the respective encoding costs, a predetermined number of the candidate encoding modes; selecting, based on the respective encoding costs of the at least some encoding modes, a best mode for encoding the block; and encoding, in a compressed bitstream, the block using the best mode.

11 Claims, 15 Drawing Sheets

(51) Int. Cl.
*H04L 29/06* (2006.01)
*H04N 19/96* (2014.01)
*H04N 19/176* (2014.01)
*H04N 19/159* (2014.01)

(52) U.S. Cl.
CPC ......... *H04N 19/159* (2014.11); *H04N 19/176* (2014.11); *H04N 19/96* (2014.11)

(58) Field of Classification Search
CPC .. H04N 19/136; H04N 19/159; H04N 19/167; H04N 19/172; H04N 19/184; H04N 19/59
See application file for complete search history.

(56) References Cited

U.S. PATENT DOCUMENTS

2016/0366422 A1* 12/2016 Yin ...................... H04N 19/649
2018/0139450 A1 5/2018 Gao et al.
2019/0045195 A1* 2/2019 Gokhale ............. H04N 19/119

OTHER PUBLICATIONS

Springenberg et al.; "Striving for Simplicity: The All Convolutional Net"; University of Freiburg; Apr. 13, 2015. pp. 1-14.
Wiegand et al.; "Rate-Constrained Coder Control and Comparison of Video Coding Standards"; IEEE Transactions on Circuits and Systems for Video Technology, vol. 13, No. 7, Jul. 2003; pp. 688-703.
Dumoulin et al.; "A guide to convolution arithmetic for deep learning"; MILA, Université de Montreal; Jan. 11, 2018; pp. 1-31.
Xue et al.; "Reducing Complexity of HEVC: A Deep Learning Approach"; Mar. 22, 2018; pp. 1-17.
Hien et al; "A guide to receptive field arithmetic for Convolutional Neural Networks"; Apr. 5, 2017; pp. 1-10.
Redmond, et al.; "You Only Look Once: Unified, Real-Time Object Detection"; University of Washington , Allen Institute for Aly, Facebook AI Research; http://pjreddie.com/yolo/; May 9, 2016; pp. 1-10.
Correa et al.; "Fast HEVC encoding decisions using data mining"; IEEE Transactions on Circuits and Systems for Video Technology—Apr. 2015; pp. 1-14.
He et al.; "Fast HEVC Coding Unit Decision Based on BP-Neural Network"; International Journal of Grid Distribution Computing vol. 8, No. 4, (2015), pp. 289-300.
Duanmu et al.; "Fast CU Partition Decision Using Machine Learning for Screen Content Compression"; pp. 1-5; 2015.
Bankoski, et al., "Technical Overview of VP8, an Open Source Video Codec for the Web", Jul. 11, 2011, 6 pp.
Bankoski et al, "VP8 Data Format and Decoding Guide", Independent Submission RFC 6389, Nov. 2011, 305 pp.
Bankoski et al., "VP8 Data Format and Decoding Guide draft-bankoski-vp8-bitstream-02", Network Working Group, Internet—Draft, May 18, 2011, 288 pages.
"Introduction to Video Coding Part 1: Transform Coding", Mozilla, Mar. 2012, 171 pp.
"Overview VP7 Data Format and Decoder", Version 1.5, On2 Technologies, Inc., Mar. 28, 2005, 65 pp.
Series H: Audiovisual and Multimedia Systems, Infrastructure of audiovisual services—Coding of moving video, Advanced video coding for generic audiovisual services, International Telecommunication Union, Version 11, Mar. 2009. 670 pp.
Series H: Audiovisual and Multimedia Systems, Infrastructure of audiovisual services—Coding of moving video, Advanced video coding for generic audiovisual services, International Telecommunication Union, Version 12, Mar. 2010, 676 pp.
Series H: Audiovisual and Multimedia Systems, Infrastructure of audiovisual services—Coding of moving video, Amendment 2: New profiles for professional applications, International Telecommunication Union, Apr. 2007, 75 pp.
Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.
Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.
Series H: Audiovisual and Multimedia Systems, Infrastructure of audiovisual services—Coding of moving video, Advanced video coding for generic audiovisual services, Version 1, International Telecommunication Union, May 2003, 282 pp.
Series H: Audiovisual and Multimedia Systems, Infrastructure of audiovisual services—Coding of moving video, Advanced video coding for generic audiovisual services, Version 3, International Telecommunication Union, Mar. 2005, 343 pp.
"VP6 Bitstream and Decoder Specification", Version 1.02, On2 Technologies, Inc., Aug. 17, 2006, 88 pp.
"VP6 Bitstream and Decoder Specification", Version 1.03, On2 Technologies, Inc., Oct. 29, 2007, 95 pp.
"VP8 Data Format and Decoding Guide, WebM Project", Google On2, Dec. 1, 2010, 103 pp.

* cited by examiner

```
1   static void get_energy_distribution_fine(const AV1_COMP *cpi, BLOCK_SIZE bsize,
2                                            const uint8_t *src, int src_stride,
3                                            const uint8_t *dst, int dst_stride,
4                                            int need_4th, double *hordist,
5                                            double *verdist) {
6     const int bw = block_size_wide[bsize];
7     const int bh = block_size_high[bsize];
8     unsigned int esq[16] = { 0, 0, 0, 0, 0, 0, 0, 0, 0, 0, 0, 0, 0, 0, 0, 0 };
9     if (bsize < BLOCK_16X16 || (bsize >= BLOCK_4X16 && bsize <= BLOCK_32X8)) {
10      // Special cases: calculate 'esq' values manually, as we don't have 'vf'
11      // functions for the 16 (very small) sub-blocks of this block.
12      const int w_shift = (bw == 4) ? 0 : (bw == 8) ? 1 : (bw == 16) ? 2 : 3;
13      const int h_shift = (bh == 4) ? 0 : (bh == 8) ? 1 : (bh == 16) ? 2 : 3;
14      assert(bw <= 32);
15      assert(bh <= 32);
16      assert(((bw - 1) >> w_shift) + (((bh - 1) >> h_shift) << 2) == 15);
17      if (cpi->common.seq_params.use_highbitdepth) {
18        const uint16_t *src16 = CONVERT_TO_SHORTPTR(src);
19        const uint16_t *dst16 = CONVERT_TO_SHORTPTR(dst);
20        for (int i = 0; i < bh; ++i)
21          for (int j = 0; j < bw; ++j) {
22            const int index = (j >> w_shift) + ((i >> h_shift) << 2);
23            esq[index] +=
24                (src16[j + i * src_stride] - dst16[j + i * dst_stride]) *
25                (src16[j + i * src_stride] - dst16[j + i * dst_stride]);
26          }
27      } else {
28        for (int i = 0; i < bh; ++i)
29          for (int j = 0; j < bw; ++j) {
30            const int index = (j >> w_shift) + ((i >> h_shift) << 2);
31            esq[index] += (src[j + i * src_stride] - dst[j + i * dst_stride]) *
32                          (src[j + i * src_stride] - dst[j + i * dst_stride]);
33          }
34      }
35    } else {  // Calculate 'esq' values using 'vf' functions on the 16 sub-blocks.
36      const int f_index =
37          (bsize < BLOCK_SIZES) ? bsize - BLOCK_16X16 : bsize - BLOCK_8X16;
38      assert(f_index >= 0 && f_index < BLOCK_SIZES_ALL);
39      const BLOCK_SIZE subsize = (BLOCK_SIZE)f_index;
40      assert(block_size_wide[bsize] == 4 * block_size_wide[subsize]);
41      assert(block_size_high[bsize] == 4 * block_size_high[subsize]);
42      cpi->fn_ptr[subsize].vf(src, src_stride, dst, dst_stride, &esq[0]);
43      cpi->fn_ptr[subsize].vf(src + bw / 4, src_stride, dst + bw / 4, dst_stride,
44                              &esq[1]);
45      cpi->fn_ptr[subsize].vf(src + bw / 2, src_stride, dst + bw / 2, dst_stride,
46                              &esq[2]);
47      cpi->fn_ptr[subsize].vf(src + 3 * bw / 4, src_stride, dst + 3 * bw / 4,
48                              dst_stride, &esq[3]);
49      src += bh / 4 * src_stride;
50      dst += bh / 4 * dst_stride;
```

FIG. 13A

```
51      cpi->fn_ptr[subsize].vf(src, src_stride, dst, dst_stride, &esq[4]);
52      cpi->fn_ptr[subsize].vf(src + bw / 4, src_stride, dst + bw / 4, dst_stride,
53                              &esq[5]);
54      cpi->fn_ptr[subsize].vf(src + bw / 2, src_stride, dst + bw / 2, dst_stride,
55                              &esq[6]);
56      cpi->fn_ptr[subsize].vf(src + 3 * bw / 4, src_stride, dst + 3 * bw / 4,
57                              dst_stride, &esq[7]);
58      src += bh / 4 * src_stride;
59      dst += bh / 4 * dst_stride;
60      cpi->fn_ptr[subsize].vf(src, src_stride, dst, dst_stride, &esq[8]);
61      cpi->fn_ptr[subsize].vf(src + bw / 4, src_stride, dst + bw / 4, dst_stride,
62                              &esq[9]);
63      cpi->fn_ptr[subsize].vf(src + bw / 2, src_stride, dst + bw / 2, dst_stride,
64                              &esq[10]);
65      cpi->fn_ptr[subsize].vf(src + 3 * bw / 4, src_stride, dst + 3 * bw / 4,
66                              dst_stride, &esq[11]);
67      src += bh / 4 * src_stride;
68      dst += bh / 4 * dst_stride;
69      cpi->fn_ptr[subsize].vf(src, src_stride, dst, dst_stride, &esq[12]);
70      cpi->fn_ptr[subsize].vf(src + bw / 4, src_stride, dst + bw / 4, dst_stride,
71                              &esq[13]);
72      cpi->fn_ptr[subsize].vf(src + bw / 2, src_stride, dst + bw / 2, dst_stride,
73                              &esq[14]);
74      cpi->fn_ptr[subsize].vf(src + 3 * bw / 4, src_stride, dst + 3 * bw / 4,
75                              dst_stride, &esq[15]);
76    }
77    double total = (double)esq[0] + esq[1] + esq[2] + esq[3] + esq[4] + esq[5] +
78                   esq[6] + esq[7] + esq[8] + esq[9] + esq[10] + esq[11] +
79                   esq[12] + esq[13] + esq[14] + esq[15];
80    if (total > 0) {
81      const double e_recip = 1.0 / total;
82      hordist[0] = ((double)esq[0] + esq[4] + esq[8] + esq[12]) * e_recip;
83      hordist[1] = ((double)esq[1] + esq[5] + esq[9] + esq[13]) * e_recip;
84      hordist[2] = ((double)esq[2] + esq[6] + esq[10] + esq[14]) * e_recip;
85      if (need_4th) {
86        hordist[3] = ((double)esq[3] + esq[7] + esq[11] + esq[15]) * e_recip;
87      }
88      verdist[0] = ((double)esq[0] + esq[1] + esq[2] + esq[3]) * e_recip;
89      verdist[1] = ((double)esq[4] + esq[5] + esq[6] + esq[7]) * e_recip;
90      verdist[2] = ((double)esq[8] + esq[9] + esq[10] + esq[11]) * e_recip;
91      if (need_4th) {
92        verdist[3] = ((double)esq[12] + esq[13] + esq[14] + esq[15]) * e_recip;
93      }
94    } else {
95      hordist[0] = verdist[0] = 0.25;
96      hordist[1] = verdist[1] = 0.25;
97      hordist[2] = verdist[2] = 0.25;
98      if (need_4th) {
99        hordist[3] = verdist[3] = 0.25;
100     }
101   }
102 }
```

FIG. 13B

```
1   static void get_horver_correlation(const int16_t *diff, int stride, int w,
2                                      int h, double *hcorr, double *vcorr) {
3     // Returns hor/ver correlation coefficient
4     const int num = (h - 1) * (w - 1);
5     double num_r;
6     int i, j;
7     int64_t xy_sum = 0, xz_sum = 0;
8     int64_t x_sum = 0, y_sum = 0, z_sum = 0;
9     int64_t x2_sum = 0, y2_sum = 0, z2_sum = 0;
10    double x_var_n, y_var_n, z_var_n, xy_var_n, xz_var_n;
11    *hcorr = *vcorr = 1;
12    assert(num > 0);
13    num_r = 1.0 / num;
14    for (i = 1; i < h; ++i) {
15      for (j = 1; j < w; ++j) {
16        const int16_t x = diff[i * stride + j];
17        const int16_t y = diff[i * stride + j - 1];
18        const int16_t z = diff[(i - 1) * stride + j];
19        xy_sum += x * y;
20        xz_sum += x * z;
21        x_sum += x;
22        y_sum += y;
23        z_sum += z;
24        x2_sum += x * x;
25        y2_sum += y * y;
26        z2_sum += z * z;
27      }
28    }
29    x_var_n = x2_sum - (x_sum * x_sum) * num_r;
30    y_var_n = y2_sum - (y_sum * y_sum) * num_r;
31    z_var_n = z2_sum - (z_sum * z_sum) * num_r;
32    xy_var_n = xy_sum - (x_sum * y_sum) * num_r;
33    xz_var_n = xz_sum - (x_sum * z_sum) * num_r;
34    if (x_var_n > 0 && y_var_n > 0) {
35      *hcorr = xy_var_n / sqrt(x_var_n * y_var_n);
36      *hcorr = *hcorr < 0 ? 0 : *hcorr;
37    }
38    if (x_var_n > 0 && z_var_n > 0) {
39      *vcorr = xz_var_n / sqrt(x_var_n * z_var_n);
40      *vcorr = *vcorr < 0 ? 0 : *vcorr;
41    }
42  }
```

RATE/DISTORTION/RDCOST MODELING WITH MACHINE LEARNING

CROSS-REFERENCE TO RELATED APPLICATION(S)

This application claims priority to and the benefit of U.S. Provisional Application Patent Ser. No. 62/778,260, filed Dec. 11, 2018, the entire disclosure of which is hereby incorporated by reference.

BACKGROUND

Digital video streams may represent video using a sequence of frames or still images. Digital video can be used for various applications, including, for example, video conferencing, high-definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including compression and other encoding techniques.

Over the years, the coding efficiency of video encoders has improved. Coding efficiency can mean encoding a video at the lowest possible bit rate while minimizing distortion (i.e., while maintaining a certain level of video quality). However, the improved coding efficiency has resulted in increased computational complexity. That is, more computation time is required by an encoder to achieve the improved coding efficiency. As such, it is desirable to obtain improved coding efficiencies with less computation time (i.e., reduced computational complexity).

SUMMARY

One aspect of the disclosed implementations is a method for encoding a block of a video stream. The method includes generating, using pixel values of the block, block features for the block; for each candidate encoding mode of candidate encoding modes, generating, using the block features and the each candidate encoding mode as inputs to a machine-learning module, a respective encoding cost; selecting, based on the respective encoding costs, a predetermined number of the candidate encoding modes; selecting, based on the respective encoding costs of the at least some encoding modes, a best mode for encoding the block; and encoding, in a compressed bitstream, the block using the best mode.

Another aspect is an apparatus for encoding a block of a video stream. The apparatus includes a memory and a processor. The processor is configured to execute instructions stored in the memory to generate, using pixel values of the block, block features for the block; for each candidate encoding mode of candidate encoding modes, generate, using the block features and the each candidate encoding mode, a respective encoding cost; select, based on the respective encoding costs, a predetermined number of the candidate encoding modes; select, based on the respective encoding costs of the at least some encoding modes, a best mode for encoding the block; and encode, in a compressed bitstream, the block using the best mode.

Another aspect is an apparatus for decoding a block of a video stream. The apparatus includes a memory and a processor. The processor is configured to execute instructions stored in the memory to decode, from a compressed bitstream, the block using a decoding mode that is encoded in the compressed bitstream by an encoder. The encoder encoded the decoding mode in the compressed stream by steps including generating, using pixel values of a source block, block features for the source block; for each candidate encoding mode of candidate encoding modes, generating, using the block features and the each candidate encoding mode, a respective encoding cost; selecting, based on the respective encoding costs, a predetermined number of the candidate encoding modes; selecting, based on the respective encoding costs of the at least some encoding modes, a best mode for encoding the source block; and encoding, in the compressed bitstream, the source block using the best mode.

These and other aspects of the present disclosure are disclosed in the following detailed description of the embodiments, the appended claims, and the accompanying figures.

BRIEF DESCRIPTION OF THE DRAWINGS

The description herein makes reference to the accompanying drawings, wherein like reference numerals refer to like parts throughout the several views.

FIGS. 13A-13B illustrate an example of a sample code for generating horizontal and vertical distribution features according to implementations of this disclosure.

FIG. 14 illustrate an example of a sample code for generating horizontal and vertical correlation features according to implementations of this disclosure.

DETAILED DESCRIPTION

Figure 1:
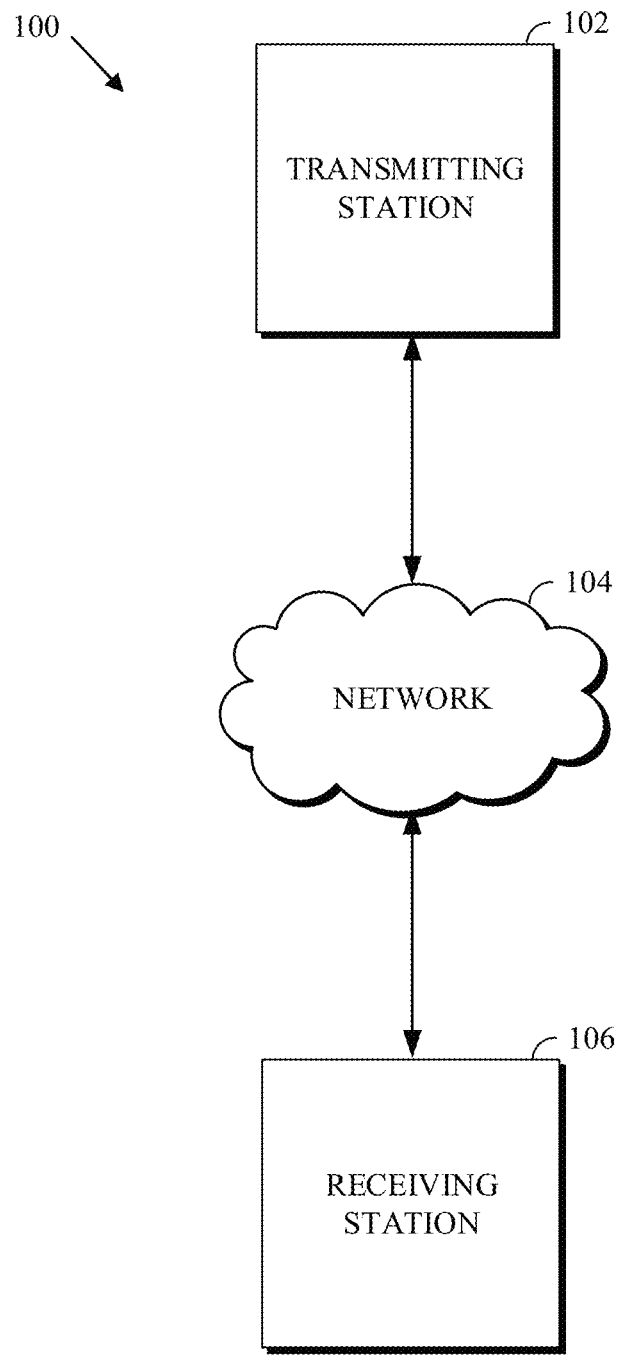
FIG. 1 is a schematic of a video encoding and decoding system.

Modern video codecs (e.g., H.264, which is also known as MPEG-4 AVC; VP9; H.265, which is also known as HEVC; AVS2; and AV1) define and use a large number of tools and configurations that are used to improve coding efficiency. Coding efficiency is typically measured in terms of both rate and distortion. Rate refers to the number of bits required for encoding (such as encoding a block, a frame, etc.). Distortion measures the quality loss between, for example, a source video block and a reconstructed version of source video block. By performing a rate-distortion optimization (RDO) process, a video codec optimizes the amount of distortion against the rate required to encode the video.

To determine an optimal combination of tools and configurations (e.g., parameters) to be used, a video encoder can use a mode decision process. The mode decision process can examine (e.g., test, evaluate, etc.) at least some of the valid combinations of tools. In an example, all possible combinations are examined.

Assume that a first combination of parameters results in a first rate (e.g., rate=100) and a first distortion (e.g., distortion=90) and that a second combination of parameters results in a second rate (e.g., rate=120) and a second distortion (e.g., distortion=80). A procedure (e.g., a technique, etc.) is required to evaluate which of the first combination and the second combination is the better combination of parameters. That is, which of the first combination and the second combination is to be used for encoding. To evaluate whether one combination is better than another, a metric can be computed for each of the examined combinations and the respective metrics compared. In an example, the metric can combine the rate and distortion to produce one single scalar value, as described below. In this disclosure, the rate-distortion cost is used as such as scalar value.

An example of a mode decision process is an intra-prediction mode decision process, which determines the best intra-prediction mode for coding a coding block. In the HEVC encoder, for example, 35 intra-prediction modes are possible for blocks that are larger than 4×4. Each of the intra-prediction modes dictates how a respective prediction block is determined. The mode decision process, in this context, may determine a respective prediction block for each of the intra-prediction modes and select the intra-prediction mode corresponding to the smallest rate-distortion (RD) cost. Said another way, the mode decision process selects the intra-prediction mode that provides the best rate-distortion performance.

Another example of a mode decision process is a partition decision process, which determines an optimal sub-partitioning of a superblock (also known as a coding tree unit or CTU). A partition decision process is described below with respect to FIG. 7. Other examples of mode decisions include a decision as to, in the case of inter prediction, which interpolation filter (also referred to as sub-pixel interpolation filter) to use; and a decision as to a transform type to use in transforming a block (such as a residual block or an image block) from the pixel domain (such as a residual block) to the frequency domain (such as a transform block that includes transform coefficients).

As is known, inter-prediction (also referred to as motion-compensated prediction) may include encoding a current block from a current frame by encoding the difference between the current block and a prediction block. Motion-compensated prediction may involve the use of a sub-pixel interpolation filter that generates filtered sub-pixel values at defined locations between the full pixels (also called integer pixels) along rows, columns, or both. The interpolation filter can be one of a number of interpolation filters available for use in motion-compensated prediction. Each of the interpolation filters can have a different frequency profile. A sub-pixel interpolation filter may be selected from a set of predefined or available sub-pixel interpolation filter types. The predefined sub-pixel interpolation filter types can include a smooth interpolation filter (EIGHTTAP_SMOOTH), a sharp interpolation filter (EIGHTTAP_SHARP), a normal interpolation filter (EIGHTTAP), a bilinear interpolation filter (Bi-linear), fewer, more, or other interpolation filters. A description of the semantics (e.g., the frequency responses, tap weights, etc.) of these interpolation filter types is not necessary for the understanding or use of this disclosure.

Some video formats use different interpolation filters. For example, VP9 uses four interpolation filters: a smooth filter, a normal filter, a sharp filter, and a bilinear filter. The interpolation filter to be used by a decoder to generate a prediction block may be signaled, in the encoded bitstream, in the header of the frame containing the block to be predicted. As such, the same interpolation filter is used to generate sub-pixel prediction blocks for all blocks of the frame. The interpolation filter may also be signaled at a coding unit level. As such, the same interpolation filter is used for every block (e.g., every prediction block) of the coding unit to generate sub-pixel prediction blocks for the blocks of the coding unit. A coding unit may be a 64×64 pixel block of a video frame and can be further partitioned into smaller blocks. An encoder may generate a prediction block based on each of the available interpolation filters. The encoder then selects (e.g., to signal to a decoder) the interpolation filter that results in, e.g., the best rate-distortion cost. As mentioned above, a rate-distortion cost refers to a ratio that balances an amount of distortion (i.e., loss in video quality) with rate (i.e., the number of bits) required for encoding.

A codec can use multiple transform types. A transform type can be used to generate a transform block from a pixel-domain block; and an inverse transform corresponding to the transform type can be used to generate a pixel-domain block from the transform block. Available transform types can include a one-dimensional Discrete Cosine Transform (1D DCT) or its approximation, one-dimensional Discrete Sine Transform DST (1D DST) or its approximation, a two-dimensional DCT (2D DCT) or its approximation, two-dimensional DST (2D DST) or its approximation, and an identity transform. Other transform types can be available. In an example, a one-dimensional transform (1D DCT or 1D DST) can be applied in one dimension (e.g., row or column) and the identity transform applied in the other dimension. More, fewer, or other transform types can be available in a codec.

Quantization parameters in video codecs can be used to control the tradeoff between rate and distortion. Usually, a larger quantization parameter means higher quantization (such as of transform coefficients) resulting in a lower rate but higher distortion; and a smaller quantization parameter means lower quantization resulting in a higher rate but a lower distortion. The variables QP, q, and Q may be used interchangeably in this disclosure to refer to a quantization parameter.

The value of the quantization parameter can be fixed. For example, an encoder can use one quantization parameter value to encode all frames and/or all blocks of a video. In other examples, the quantization parameter can change, for example, from frame to frame. For example, in the case of a video conference application, the encoder can change the quantization parameter value based on fluctuations in network bandwidth.

As the quantization parameter can be used to control the tradeoff between rate and distortion, the quantization parameter can be used to calculate the metrics associated with each combination of parameters. As mentioned above, the metric can combine the rate and the distortion values of a combination of encoding parameters.

As mentioned above, the metric can be the rate-distortion (RD) cost. The combination resulting in the lowest cost (e.g., lowest RD cost) can be used for encoding, for example, a block or a frame in a compressed bitstream. The RD costs are computed using a quantization parameter. More generally, whenever an encoder decision (e.g., a mode decision) is based on the RD cost, the QP value may be used by the encoder to determine the RD cost. An example of estimating, such as by a typical encoder, the rate and distortion cost of coding an image block X by using a prediction mode $m_i$ is described with respect to FIGS. 8-9.

In an example, the QP can be used to derive a multiplier that is used to combine the rate and distortion values into one metric. Some codecs may refer to the multiplier as the Lagrange multiplier (denoted $\lambda_{mode}$); other codecs may use a similar multiplier that is referred as rdmult. Each codec may have a different method of calculating the multiplier. Unless the context makes clear, the multiplier is referred to herein, regardless of the codec, as the Lagrange multiplier or Lagrange parameter.

To reiterate, the Lagrange multiplier can be used to evaluate the RD costs of competing modes (i.e., competing combinations of parameters). Specifically, let $r_m$ denote the rate (in bits) resulting from using a mode m and let $d_m$ denote the resulting distortion. The rate distortion cost of selecting the mode m can be computed as a scalar value: $d_m + \lambda_{mode} r_m$. By using the Lagrange parameter $\lambda_{mode}$, it is then possible to compare the cost of two modes and select one with the lower combined RD cost. This technique of evaluating rate distortion cost is a basis of mode decision processes in at least some video codecs.

Different video codecs may use different techniques to compute the Lagrange multipliers from the quantization parameters. This is due in part to the fact that the different codecs may have different meanings (e.g., definitions, semantics, etc.) for, and method of use of, quantization parameters.

Codecs (referred to herein as H264 codecs) that implement the H264 standard may derive the Lagrange multiplier $\lambda_{mode}$ using formula (1):

$$\lambda_{mode} = 0.85 \times 2^{(QP-12)/3} \quad (1)$$

Codecs (referred to herein as HEVC codecs) that implement the HEVC standard may use a formula that is similar to the formula (1). Codecs (referred to herein as H263 codecs) that implement the H263 standard may derive the Lagrange multipliers $\lambda_{mode}$ using formula (2):

$$\lambda_{mode} = 0.85 \cdot Q_{H263}^2 \quad (2)$$

Codecs (referred to herein as VP9 codecs) that implement the VP9 standard may derive the multiplier rdmult using formula (3):

$$rdmult = 88 \cdot q^2 / 24 \quad (3)$$

Codecs (referred to herein as AV1 codecs) that implement the AV1 standard may derive the Lagrange multiplier $\lambda_{mode}$ using formula (4):

$$\lambda_{mode} = 0.12 \cdot Q_{AV1}^2 / 256 \quad (4)$$

As can be seen in the above cases, the multiplier has a non-linear relationship to the quantization parameter. In the cases of HEVC and H264, the multiplier has an exponential relationship to the QP; and in the cases of H263, VP9, and AV1, the multiplier has a quadratic relationship to the QP. Note that the multipliers may undergo further changes before being used in the respective codecs to account for additional side information included in a compressed bitstream by the encoder. Examples of side information include picture type (e.g., intra vs. inter predicted frame), color components (e.g., luminance or chrominance), and/or region of interest. In an example, such additional changes can be linear changes to the multipliers.

As mentioned above, the best mode can be selected from many possible combinations. As the number of possible tools and parameters increases, the number of combinations also increases, which, in turn, increases the time required to determine the best mode. For example, the AV1 codec includes roughly 160 additional tools over the AV9 codec, thereby resulting in a significant increase in search time for the best mode.

In a typical encoder, the RD cost associated with a specific mode (or a specific combination of tools) may be determined by performing at least a subset of the encoding steps of the encoder. The subset of the encoding steps can include, depending on the mode for which an RD cost is to be determined, at least one of determining a prediction block, determining a residual block, determining a transform type, determining an interpolation filter, quantizing a transform block, entropy-encoding (such as using a hypothetical encoder), and so on. Note that the encoding steps listed in the previous sentence are neither intended to be an exhaustive list of encoding steps that a typical encoder may perform nor presented in any particular order (that is, an encoder does not necessarily perform these steps, as listed, sequentially).

Accordingly, techniques, such as machine learning, may be exploited to reduce the time required to determine the best mode. Machine learning can be well suited to address the computational complexity problem in video coding.

As further described below, instead of performing the encoding steps (i.e., a brute-force approach) for determining a rate and a distortion (or, equivalently, an RD cost) associated with mode, a machine-learning model can be used to estimate the rate and the distortion, or to estimate the RD cost, associated with the mode. For example, based on features associated with input data (e.g., a prediction block, a transform block, etc.), estimates (for the rate and distortion, or the RD cost) can be determined for respective modes. One or more modes corresponding to the best estimates can selected. In an example, the one mode corresponding to the best estimate can be selected. As such, the input block can be encoded using the one mode. In another example, the modes (i.e., candidate modes) corresponding to the best k (a predetermined number of modes) estimates can be selected. As such, the list of possible modes can be pruned, and the unselected modes ignored. Actual computation (i.e., rate-distortion computation) can be performed with respect to each of the candidate modes to determine the best mode.

A vast amount of training data can be generated, for example, by using the brute-force approaches to mode decision. That is, the training data can be obtained by an encoder performing standard encoding techniques, such as those described with respect to FIGS. 4 and 6-9. Specifically, the brute-force, on-the-fly mode decision process may be replaced, at least partially, with the trained machine-learning model, which can infer (e.g., estimate) a rate and distortion or an RD code for a mode decision for use for a large class of video data input. A well-trained machine-learning model can be expected to closely match the brute-force approach in coding efficiency but at a significantly lower computational cost or with a regular or dataflow-oriented computational cost.

The training data can be used, during the learning phase of machine learning, to derive (e.g., learn, infer, etc.) a machine-learning model that is (e.g., defines, constitutes, etc.) a mapping from the input data to an output that constitutes an RD cost or from which an RD cost can be calculated. Accordingly, the machine-learning model can be used to replace the brute-force, computation heavy encoding processes (such as those described with respect to FIGS. 4 and 6-9), thereby reducing the computation complexity in mode decision.

The predictive capabilities (i.e., accuracy) of a machine-learning model are as good as the inputs used to train the machine-learning model and the inputs presented to the machine-learning model to predict a result (e.g., the best mode). As such, when machine learning is used for video encoding, it is critical that the correct set of inputs and the correct (e.g., appropriate, optimal, etc.) forms of such inputs are used. Once a machine-learning model is trained, the model computes the output as a deterministic function of its input. As such, it can be critical to use the correct input(s) and appropriate forms of the inputs to the machine-learning model. In an example, the machine-learning model can be a neural-network model, which can be a convolutional neural-network (CNN) model.

At a high level, and without loss of generality, a typical machine-learning model, such as a classification deep-learning model, includes two main portions: a feature-extraction portion and a classification portion. The feature-extraction portion detects features of the model. The classification portion attempts to classify the detected features into a desired response. Each of the portions can include one or more layers and/or one or more operations. Herein, the desired response that is output from the classification portion can be one or more values related to the RD cost of encoding a block using a particular mode. The term "classification" is used herein to refer to the one or more of the layers that outputs one or more values from the model. The output may be a discrete value, such as a class or a category. The output may be a continuous value (e.g., a rate value, a distortion value, an RD cost value). As such, the classification portion may be more appropriately termed a regression portion.

As mentioned above, a CNN is an example of a machine-learning model. In a CNN, the feature extraction portion typically includes a set of convolutional operations, which is typically a series of filters that are used to filter an input image based on a filter (typically a square of size k, without loss of generality). For example, and in the context of machine vision, these filters can be used to find features in an input image. The features can include, for example, edges, corners, endpoints, and so on. As the number of stacked convolutional operations increases, later convolutional operations can find higher-level features. It is noted that the term "features" is used in two different contexts within this disclosure. First, "features" can be extracted, from an input image or block, by the feature extraction portion of a CNN. Second, "features" can be calculated (e.g., derived) from an input block and used as inputs to a machine learning model. The context should make clear which use of the term "features" is implied.

In a CNN, the classification (e.g., regression) portion can be a set of fully connected layers. The fully connected layers can be thought of as looking at all the input features in order to generate a high-level classifier. Several stages (e.g., a series) of high-level classifiers eventually generate the desired classification (e.g., regression) output.

As mentioned, a typical CNN network is composed of a number of convolutional operations (e.g., the feature-extraction portion) followed by a number of fully connected layers. The number of operations of each type and their respective sizes is typically determined during the training phase of the machine learning. As a person skilled in the art recognizes, additional layers and/or operations can be included in each portion. For example, combinations of Pooling, MaxPooling, Dropout, Activation, Normalization, BatchNormalization, and other operations can be grouped with convolution operations (i.e., in the features-extraction portion) and/or the fully connected operation (i.e., in the classification portion). The fully connected layers may be referred to as Dense operations. As a person skilled in the art recognizes, a convolution operation can use a SeparableConvolution2D or Convolution2D operation.

As used in this disclosure, a convolution layer can be a group of operations starting with a Convolution2D or SeparableConvolution2D operation followed by zero or more operations (e.g., Pooling, Dropout, Activation, Normalization, BatchNormalization, other operations, or a combination thereof), until another convolutional layer, a Dense operation, or the output of the CNN is reached. Similarly, a Dense layer can be a group of operations or layers starting with a Dense operation (i.e., a fully connected layer) followed by zero or more operations (e.g., Pooling, Dropout, Activation, Normalization, BatchNormalization, other operations, or a combination thereof) until another convolution layer, another Dense layer, or the output of the network is reached. The boundary between feature extraction based on convolutional networks and a feature classification using Dense operations can be marked by a Flatten operation, which flattens the multidimensional matrix from the feature extraction into a vector.

Each of the fully connected operations is a linear operation in which every input is connected to every output by a weight. As such, a fully connected layer with N number of inputs and M outputs can have a total of N×M weights. As mentioned above, a Dense operation may be generally followed by a non-linear activation function to generate an output of that layer.

Implementations according to this disclosure use a machine-learning model that can estimate the rate and distortion of the RD cost, or the RD cost itself, associated with encoding a block using a mode. The block can be any type of block the encoding of which typically involves the testing of several possible (e.g., available) modes to determine the best mode by performing and RDO process. The block can be an image block, a prediction block, or a transform block.

More generally, implementations according to this disclosure can be used by an encoder anywhere the encoder has to decide (e.g., select, chose, etc.) a mode from among multiple options. That is, instead of performing actual RD calculations (as described below with respect to FIGS. 8-9) to pick one of the multiple options, a trained machine-learning model can be used to generate estimates of the RD costs associated with respective modes. The estimates can then be used in the selected of a best mode. That is, implementations according to this disclosure can be used for cases where a best mode is typically selected from among a set of possible modes, using RDO processes. As such, mode determination processes can be significantly improved. That is, the time to determine the best mode can be shortened.

Rate and distortion or RD cost modeling with machine learning is described herein first with reference to a system in which the teachings may be incorporated.

It is noted that details of machine learning, neural networks, including convolutional neural networks, and/or details that are known to a person skilled in the art are omitted herein. For example, a skilled person in the art recognizes that the values of convolutional filters and the weights of connections between nodes (i.e., neurons) in a CNN are determined by the CNN during the training phase. Accordingly, such are not discussed in detail herein.

FIG. 1 is a schematic of a video encoding and decoding system 100. A transmitting station 102 can be, for example, a computer having an internal configuration of hardware, such as that described with respect to FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102, and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
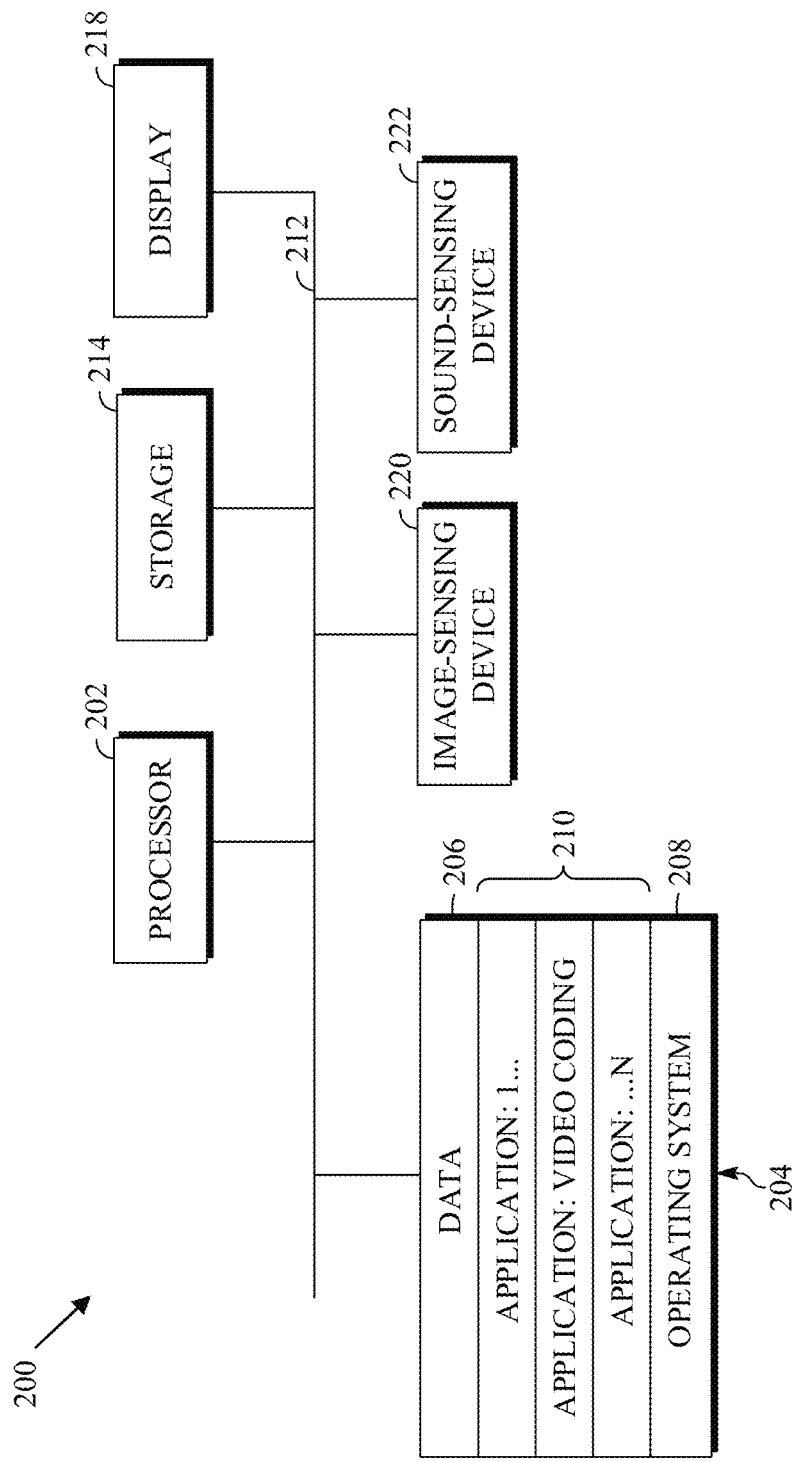
FIG. 2 is a block diagram of an example of a computing device that can implement a transmitting station or a receiving station.

In one example, the receiving station 106 can be a computer having an internal configuration of hardware, such as that described with respect to FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP (e.g., an HTTP-based video streaming protocol) may be used.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, now-existing or hereafter developed, capable of manipulating or processing information. Although the disclosed implementations can be practiced with a single processor as shown (e.g., the CPU 202), advantages in speed and efficiency can be achieved by using more than one processor.

In an implementation, a memory 204 in the computing device 200 can be a read-only memory (ROM) device or a random-access memory (RAM) device. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described herein. For example, the application programs 210 can include applications 1 through N, which further include a video coding application that performs the methods described herein. The computing device 200 can also include a secondary storage 214, which can, for example, be a memory card used with a computing device 200 that is mobile. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch-sensitive display that combines a display with a touch-sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including as a liquid crystal display (LCD); a cathode-ray tube (CRT) display; or a light-emitting diode (LED) display, such as an organic LED (OLED) display.

The computing device 200 can also include or be in communication with an image-sensing device 220, for example, a camera, or any other image-sensing device, now existing or hereafter developed, that can sense an image, such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device, now existing or hereafter developed, that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more processors) that can be coupled directly or across a local area or other network. The memory 204 can be distributed across multiple machines, such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit, such as a memory card, or multiple units, such as multiple memory cards. The computing device 200 can thus be implemented in a wide variety of configurations.

Figure 3:
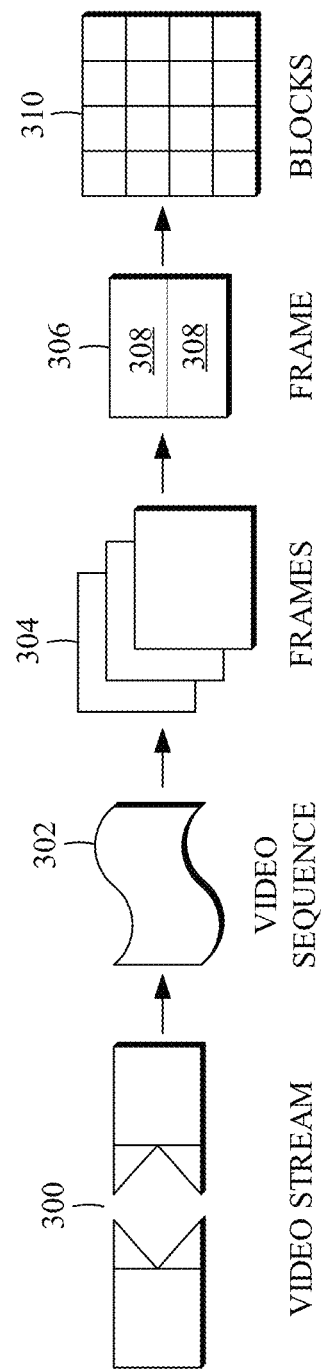
FIG. 3 is a diagram of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, for example, a frame 306. At the next level, the frame 306 can be divided into a series of segments 308 or planes. The segments 308 can be subsets of frames that permit parallel processing, for example. The segments 308 can also be subsets of frames that can separate the video data into separate colors. For example, the frame 306 of color video data can include a luminance plane and two chrominance planes. The segments 308 may be sampled at different resolutions.

Whether or not the frame 306 is divided into the segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size, such as 4×4 pixels, 8×8 pixels, 16×8 pixels, 8×16 pixels, 16×16 pixels, or larger.

Figure 4:
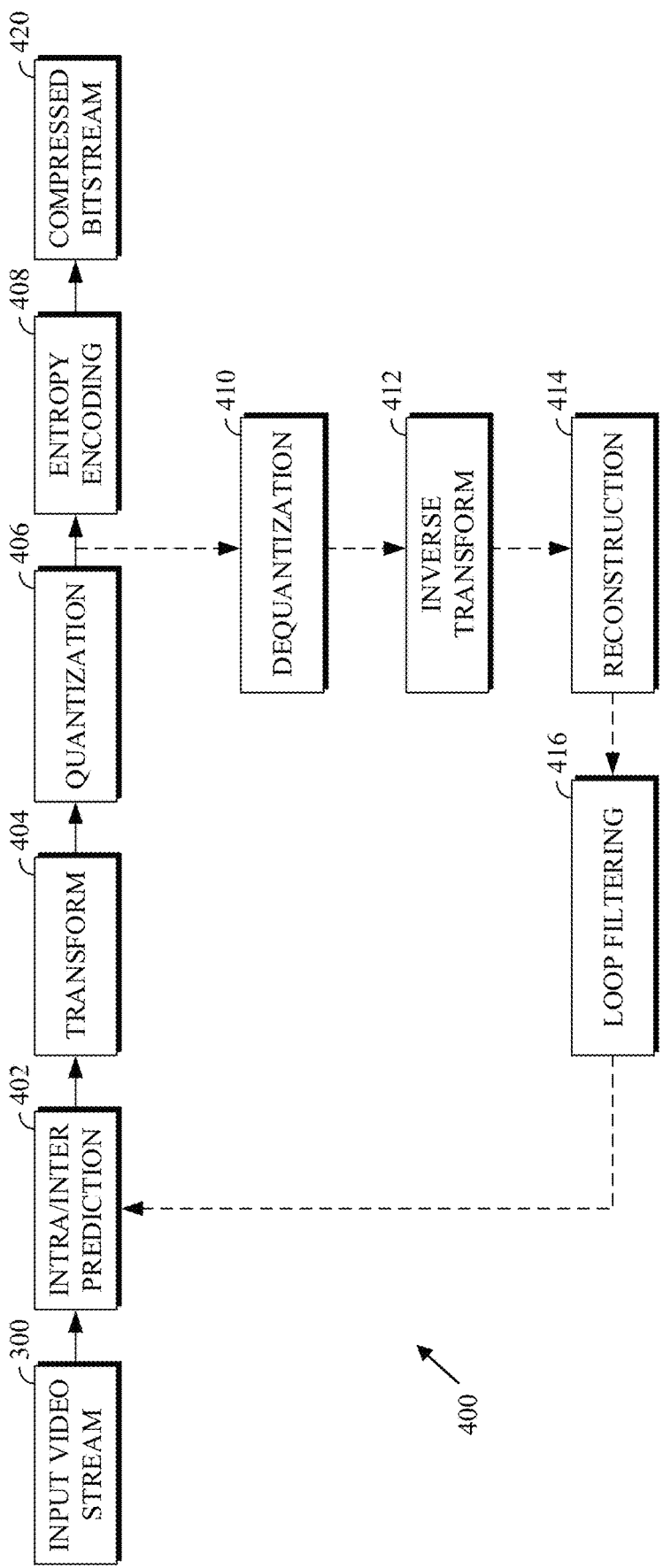
FIG. 4 is a block diagram of an encoder according to implementations of this disclosure.

FIG. 4 is a block diagram of an encoder 400 in accordance with implementations of this disclosure. The encoder 400 can be implemented, as described above, in the transmitting station 102, such as by providing a computer software program stored in memory, for example, the memory 204. The computer software program can include machine instructions that, when executed by a processor, such as the CPU 202, cause the transmitting station 102 to encode video data in manners described herein. The encoder 400 can also be implemented as specialized hardware included in, for example, the transmitting station 102. The encoder 400 has the following stages to perform the various functions in a forward path (shown by the solid connection lines) to produce an encoded or compressed bitstream 420 using the video stream 300 as input: an intra/inter-prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, the frame 306 can be processed in units of blocks. At the intra/inter-prediction stage 402, a block can be encoded using intra-frame prediction (also called intra-prediction) or inter-frame prediction (also called inter-prediction), or a combination of both. In any case, a prediction block can be formed. In the case of intra-prediction, all or part of a prediction block may be formed from samples in the current frame that have been previously encoded and reconstructed. In the case of inter-prediction, all or part of a prediction block may be formed from samples in one or more previously constructed reference frames determined using motion vectors.

Next, still referring to FIG. 4, the prediction block can be subtracted from the current block at the intra/inter-prediction stage 402 to produce a residual block (also called a residual). The transform stage 404 transforms the residual into transform coefficients in, for example, the frequency domain using block-based transforms. Such block-based transforms (i.e., transform types) include, for example, the Discrete Cosine Transform (DCT) and the Asymmetric Discrete Sine Transform (ADST). Other block-based transforms are possible. Further, combinations of different transforms may be applied to a single residual. In one example of application of a transform, the DCT transforms the residual block into the frequency domain where the transform coefficient values are based on spatial frequency. The lowest frequency (DC) coefficient is at the top-left of the matrix, and the highest frequency coefficient is at the bottom-right of the matrix. It is worth noting that the size of a prediction block, and hence the resulting residual block, may be different from the size of the transform block. For example, the prediction block may be split into smaller blocks to which separate transforms are applied.

The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. Entropy coding may be performed using any number of techniques, including token and binary trees. The entropy-encoded coefficients, together with other information used to decode the block (which may include, for example, the type of prediction used, transform type, motion vectors, and quantizer value), are then output to the compressed bitstream 420. The information to decode the block may be entropy coded into block, frame, slice, and/or section headers within the compressed bitstream 420. The compressed bitstream 420 can also be referred to as an encoded video stream or encoded video bitstream; these terms will be used interchangeably herein.

The reconstruction path in FIG. 4 (shown by the dotted connection lines) can be used to ensure that both the encoder 400 and a decoder 500 (described below) use the same reference frames and blocks to decode the compressed bitstream 420. The reconstruction path performs functions that are similar to functions that take place during the decoding process and that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter-prediction stage 402 can be added to the derivative residual to create a reconstructed block. The loop filtering stage 416 can be applied to the reconstructed block to reduce distortion, such as blocking artifacts.

Other variations of the encoder 400 can be used to encode the compressed bitstream 420. For example, a non-transform based encoder 400 can quantize the residual signal directly without the transform stage 404 for certain blocks or frames. In another implementation, an encoder 400 can have the quantization stage 406 and the dequantization stage 410 combined into a single stage.

Figure 5:
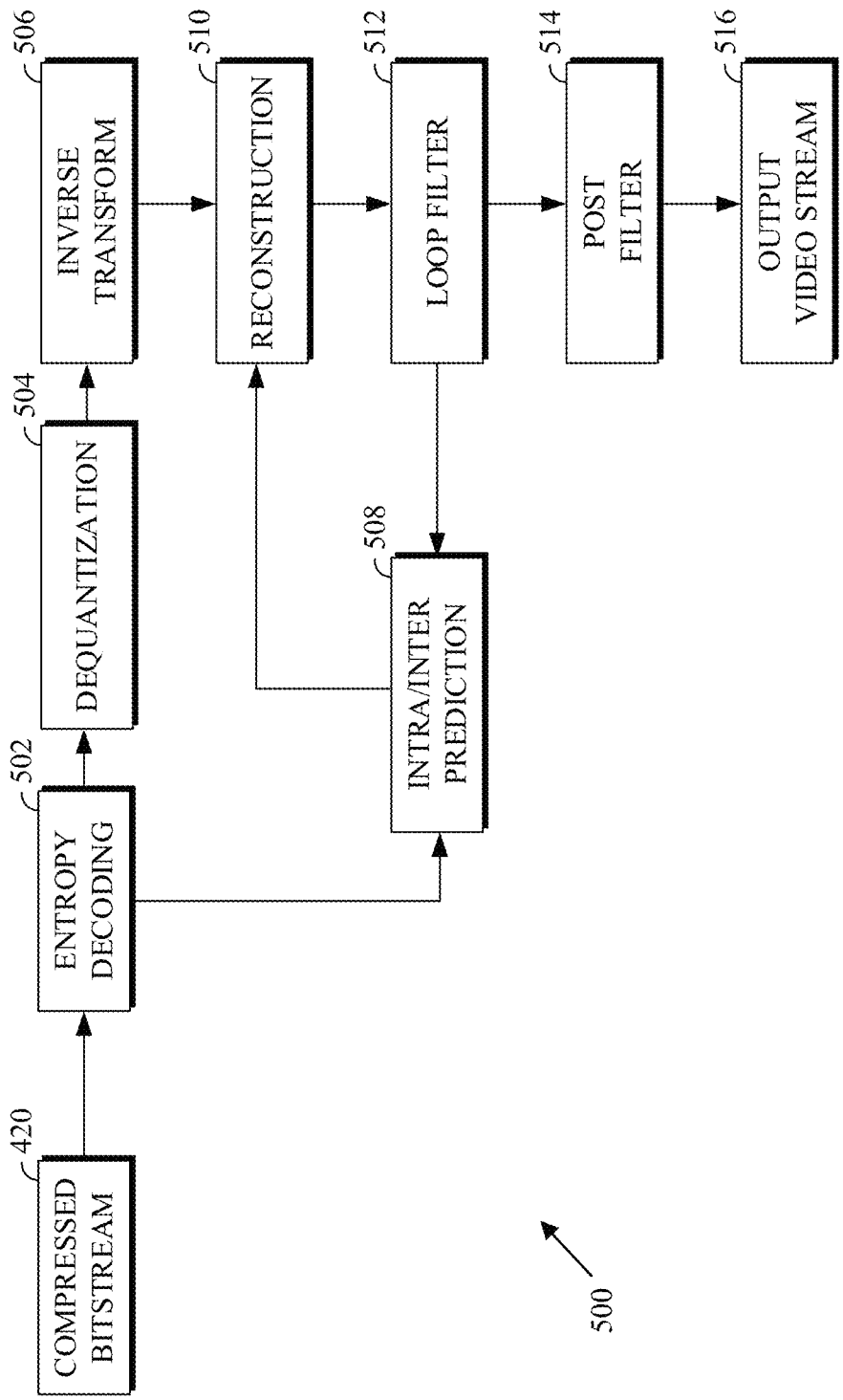
FIG. 5 is a block diagram of a decoder according to implementations of this disclosure.

FIG. 5 is a block diagram of a decoder 500 in accordance with implementations of this disclosure. The decoder 500 can be implemented in the receiving station 106, for example, by providing a computer software program stored in the memory 204. The computer software program can include machine instructions that, when executed by a processor, such as the CPU 202, cause the receiving station 106 to decode video data in the manners described below. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter-prediction stage 508, a reconstruction stage 510, a loop filtering stage 512, and a post filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients using the selected transform type to produce a derivative residual that can be identical to that created by the inverse transform stage 412 in the encoder 400. Using header information decoded from the compressed bitstream 420, the decoder 500 can use the intra/inter-prediction stage 508 to create the same prediction block as was created in the encoder 400, for example, at the intra/inter-prediction stage 402. At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In an example, the post filtering stage 514 is applied to the reconstructed block to reduce blocking distortion, and the result is output as an output video stream 516. The output video stream 516 can also be referred to as a decoded video stream; these terms will be used interchangeably herein.

Other variations of the decoder 500 can be used to decode the compressed bitstream 420. For example, the decoder 500 can produce the output video stream 516 without the post filtering stage 514. In some implementations of the decoder 500, the post filtering stage 514 is applied after the loop filtering stage 512. The loop filtering stage 512 can include an optional deblocking filtering stage. Additionally, or alternatively, the encoder 400 includes an optional deblocking filtering stage in the loop filtering stage 416.

A codec can use multiple transform types. For example, a transform type can be the transform type used by the transform stage 404 of FIG. 4 to generate the transform block. For example, the transform type (i.e., an inverse transform type) can be the transform type to be used by the dequantization stage 504 of FIG. 5. Available transform types can include a one-dimensional Discrete Cosine Transform (1D DCT) or its approximation, a one-dimensional Discrete Sine Transform (1D DST) or its approximation, a two-dimensional DCT (2D DCT) or its approximation, a two-dimensional DST (2D DST) or its approximation, and an identity transform. Other transform types can be available. In an example, a one-dimensional transform (1D DCT or 1D DST) can be applied in one dimension (e.g., row or column), and the identity transform can be applied in the other dimension.

In the cases where a 1D transform (e.g., 1D DCT, 1D DST) is used (e.g., 1D DCT is applied to columns (or rows, respectively) of a transform block), the quantized coefficients can be coded by using a row-by-row (i.e., raster) scanning order or a column-by-column scanning order. In the cases where 2D transforms (e.g., 2D DCT) are used, a different scanning order may be used to code the quantized coefficients. As indicated above, different templates can be used to derive contexts for coding the non-zero flags of the non-zero map based on the types of transforms used. As such, in an implementation, the template can be selected based on the transform type used to generate the transform block. As indicated above, examples of a transform type include: 1D DCT applied to rows (or columns) and an identity transform applied to columns (or rows); 1D DST applied to rows (or columns) and an identity transform applied to columns (or rows); 1D DCT applied to rows (or columns) and 1D DST applied to columns (or rows); a 2D DCT; and a 2D DST. Other combinations of transforms can comprise a transform type.

Figure 6:
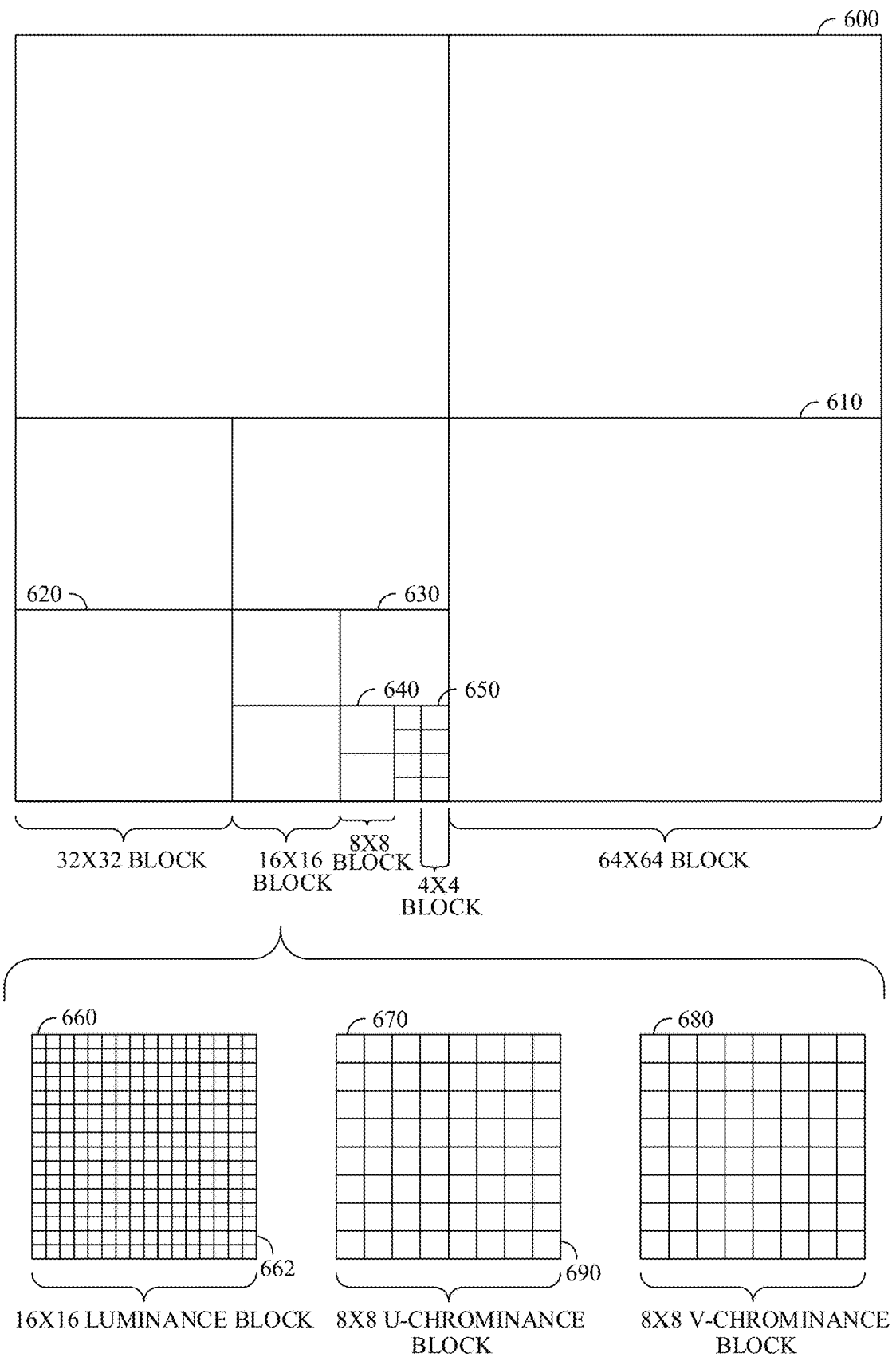
FIG. 6 is a block diagram of a representation of a portion of a frame according to implementations of this disclosure.

FIG. 6 is a block diagram of a representation of a portion 600 of a frame, such as the frame 306 of FIG. 3, according to implementations of this disclosure. As shown, the portion 600 of the frame includes four 64×64 blocks 610, which may be referred to as superblocks, in two rows and two columns in a matrix or Cartesian plane. A superblock can have a larger or a smaller size. While FIG. 6 is explained with respect to a superblock of size 64×64, the description is easily extendable to larger (e.g., 128×128) or smaller superblock sizes.

In an example, and without loss of generality, a superblock can be a basic or maximum coding unit (CU). Each superblock can include four 32×32 blocks 620. Each 32×32 block 620 can include four 16×16 blocks 630. Each 16×16 block 630 can include four 8×8 blocks 640. Each 8×8 block 640 can include four 4×4 blocks 650. Each 4×4 block 650 can include 16 pixels, which can be represented in four rows and four columns in each respective block in the Cartesian plane or matrix. The pixels can include information representing an image captured in the frame, such as luminance information, color information, and location information. In an example, a block, such as a 16×16-pixel block as shown, can include a luminance block 660, which can include luminance pixels 662; and two chrominance blocks 670/680, such as a U or Cb chrominance block 670, and a V or Cr chrominance block 680. The chrominance blocks 670/680 can include chrominance pixels 690. For example, the luminance block 660 can include 16×16 luminance pixels 662, and each chrominance block 670/680 can include 8×8 chrominance pixels 690, as shown. Although one arrangement of blocks is shown, any arrangement can be used. Although FIG. 6 shows N×M blocks, in some implementations, N×M, where N≠M, blocks can be used. For example, 32×64 blocks, 64×32 blocks, 16×32 blocks, 32×16 blocks, or any other size blocks can be used. In some implementations, N×2N blocks, 2N×N blocks, or a combination thereof can be used.

In some implementations, video coding can include ordered block-level coding. Ordered block-level coding can include coding blocks of a frame in an order, such as raster-scan order, wherein blocks can be identified and processed starting with a block in the upper left corner of the frame, or a portion of the frame, and proceeding along rows from left to right and from the top row to the bottom row, identifying each block in turn for processing. For example, the superblock in the top row and left column of a frame can be the first block coded, and the superblock immediately to the right of the first block can be the second block coded. The second row from the top can be the second row coded, such that the superblock in the left column of the second row can be coded after the superblock in the rightmost column of the first row.

In an example, coding a block can include using quad-tree coding, which can include coding smaller block units with a block in raster-scan order. The 64×64 superblock shown in the bottom-left corner of the portion of the frame shown in FIG. 6, for example, can be coded using quad-tree coding in which the top-left 32×32 block can be coded, then the top-right 32×32 block can be coded, then the bottom-left 32×32 block can be coded, and then the bottom-right 32×32 block can be coded. Each 32×32 block can be coded using quad-tree coding in which the top-left 16×16 block can be coded, then the top-right 16×16 block can be coded, then the bottom-left 16×16 block can be coded, and then the bottom-right 16×16 block can be coded. Each 16×16 block can be coded using quad-tree coding in which the top-left 8×8 block can be coded, then the top-right 8×8 block can be coded, then the bottom-left 8×8 block can be coded, and then the bottom-right 8×8 block can be coded. Each 8×8 block can be coded using quad-tree coding in which the top-left 4×4 block can be coded, then the top-right 4×4 block can be coded, then the bottom-left 4×4 block can be coded, and then the bottom-right 4×4 block can be coded. In some implementations, 8×8 blocks can be omitted for a 16×16 block, and the 16×16 block can be coded using quad-tree coding in which the top-left 4×4 block can be coded, and then the other 4×4 blocks in the 16×16 block can be coded in raster-scan order.

In an example, video coding can include compressing the information included in an original, or input, frame by omitting some of the information in the original frame from a corresponding encoded frame. For example, coding can include reducing spectral redundancy, reducing spatial redundancy, reducing temporal redundancy, or a combination thereof.

In an example, reducing spectral redundancy can include using a color model based on a luminance component (Y) and two chrominance components (U and V or Cb and Cr), which can be referred to as the YUV or YCbCr color model or color space. Using the YUV color model can include using a relatively large amount of information to represent the luminance component of a portion of a frame and using a relatively small amount of information to represent each corresponding chrominance component for the portion of the frame. For example, a portion of a frame can be represented by a high-resolution luminance component, which can include a 16×16 block of pixels, and by two lower resolution chrominance components, each of which representing the portion of the frame as an 8×8 block of pixels. A pixel can indicate a value (e.g., a value in the range from 0 to 255) and can be stored or transmitted using, for example, eight bits. Although this disclosure is described with reference to the YUV color model, any color model can be used.

Reducing spatial redundancy can include transforming a block into the frequency domain as described above. For example, a unit of an encoder, such as the entropy encoding stage 408 of FIG. 4, can perform a DCT using transform coefficient values based on spatial frequency.

Reducing temporal redundancy can include using similarities between frames to encode a frame using a relatively small amount of data based on one or more reference frames, which can be previously encoded, decoded, and reconstructed frames of the video stream. For example, a block or a pixel of a current frame can be similar to a spatially corresponding block or pixel of a reference frame. A block or a pixel of a current frame can be similar to a block or a pixel of a reference frame at a different spatial location. As such, reducing temporal redundancy can include generating motion information indicating the spatial difference (e.g., a translation between the location of the block or the pixel in the current frame and the corresponding location of the block or the pixel in the reference frame).

Reducing temporal redundancy can include identifying a block or a pixel in a reference frame, or a portion of the reference frame, that corresponds with a current block or pixel of a current frame. For example, a reference frame, or a portion of a reference frame, which can be stored in memory, can be searched for the best block or pixel to use for encoding a current block or pixel of the current frame. For example, the search may identify the block of the reference frame for which the difference in pixel values between the reference block and the current block is minimized, and can be referred to as motion searching. The portion of the reference frame searched can be limited. For example, the portion of the reference frame searched, which can be referred to as the search area, can include a limited number of rows of the reference frame. In an example, identifying the reference block can include calculating a cost function, such as a sum of absolute differences (SAD), between the pixels of the blocks in the search area and the pixels of the current block.

The spatial difference between the location of the reference block in the reference frame and the current block in the current frame can be represented as a motion vector. The difference in pixel values between the reference block and the current block can be referred to as differential data, residual data, or as a residual block. In some implementations, generating motion vectors can be referred to as motion estimation, and a pixel of a current block can be indicated based on location using Cartesian coordinates such as $f_{x,y}$. Similarly, a pixel of the search area of the reference frame can be indicated based on a location using Cartesian coordinates such as $r_{x,y}$. A motion vector (MV) for the current block can be determined based on, for example, a SAD between the pixels of the current frame and the corresponding pixels of the reference frame.

Figure 7:
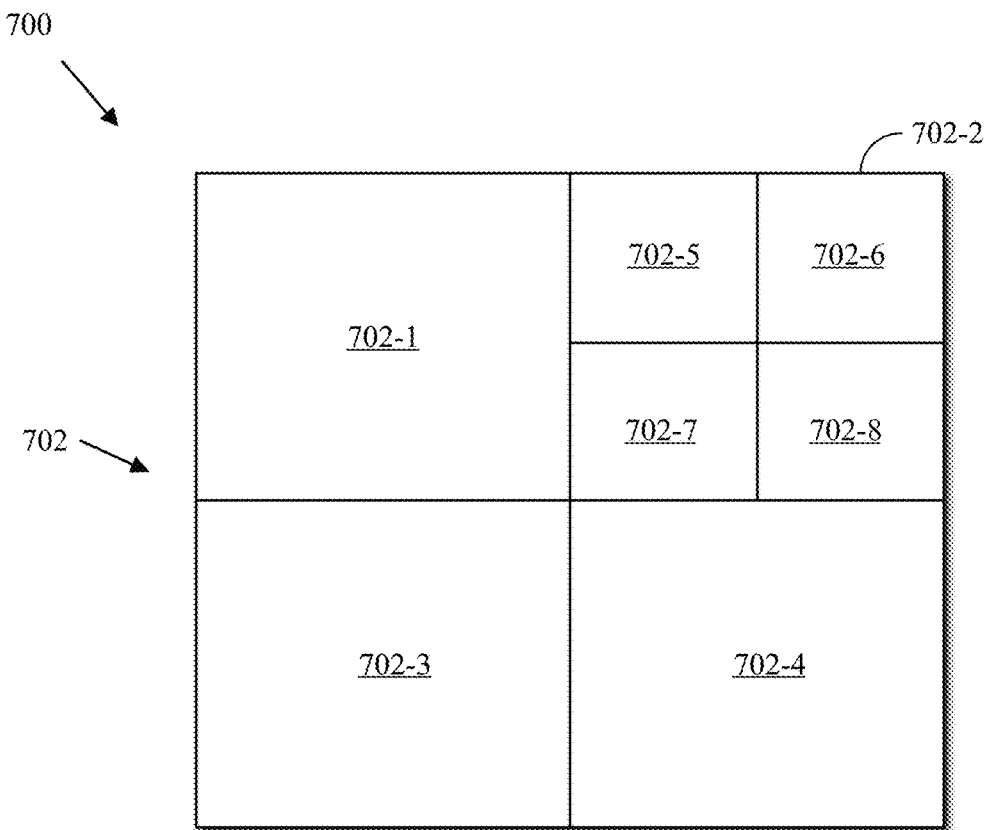
FIG. 7 is a block diagram of an example of a quad-tree representation of a block according to implementations of this disclosure.
Figure 7:
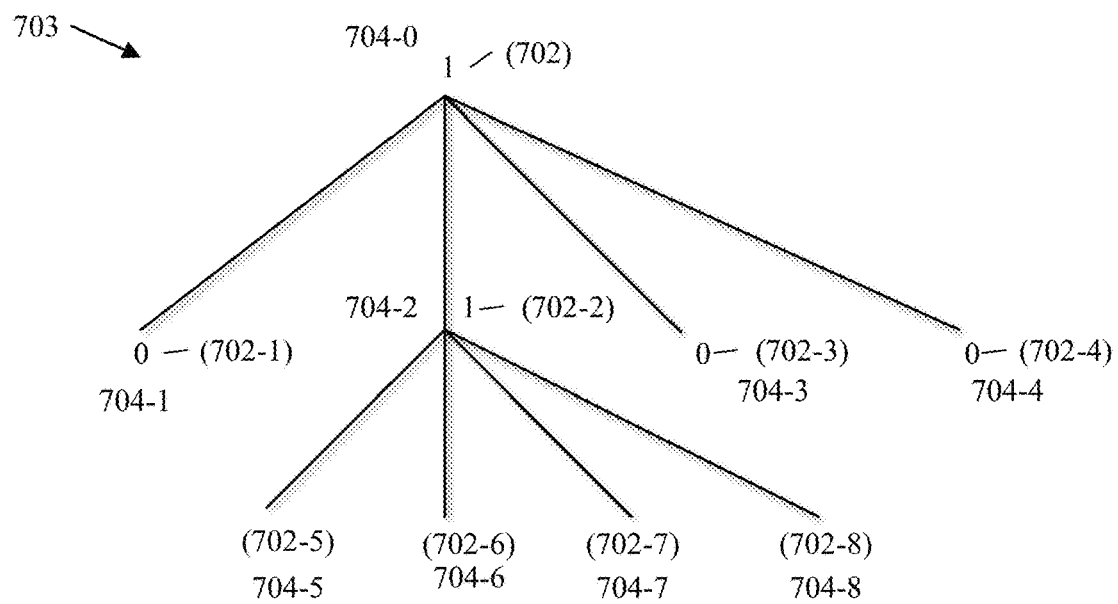

As mentioned above, a superblock can be coded using quad-tree coding. FIG. 7 is a block diagram of an example 700 of a quad-tree representation of a block according to implementations of this disclosure. The example 700 includes the block 702. As mentioned above, the block 702 can be referred to as a superblock or a CTB. The example 700 illustrates a partition of the block 702. However, the block 702 can be partitioned differently, such as by an encoder (e.g., the encoder 400 of FIG. 4) or a machine-learning model (such as described with respect to FIGS.

10-11). Partitioning a block by an encoder, such as the encoder 400 of FIG. 4, is referred to herein as brute-force approach to encoding.

The example 700 illustrates that the block 702 is partitioned into four blocks, namely, the blocks 702-1, 702-2, 702-3, and 702-4. The block 702-2 is further partitioned into the blocks 702-5, 702-6, 702-7, and 702-8. As such, if, for example, the size of the block 702 is N×M (e.g., 128×128), then the blocks 702-1, 702-2, 702-3, and 702-4 are each of size N/2×N/2 (e.g., 64×64), and the blocks 702-5, 702-6, 702-7, and 702-8 are each of size N/4×N/4 (e.g., 32×32). If a block is partitioned, it is partitioned into four equally sized, non-overlapping square sub-blocks.

A quad-tree data representation is used to describe how the block 702 is partitioned into sub-blocks, such as blocks 702-1, 702-2, 702-3, 702-4, 702-5, 702-6, 702-7, and 702-8. A quad-tree 703 of the partition of the block 702 is shown. Each node of the quad-tree 703 is assigned a flag of "1" if the node is further split into four sub-nodes and assigned a flag of "0" if the node is not split. The flag can be referred to as a split bit (e.g., 1) or a stop bit (e.g., 0) and is coded in a compressed bitstream. In a quad-tree, a node either has four child nodes or has no child nodes. A node that has no child nodes corresponds to a block that is not split further. Each of the child nodes of a split block corresponds to a sub-block.

In the quad-tree 703, each node corresponds to a sub-block of the block 702. The corresponding sub-block is shown between parentheses. For example, a node 704-1, which has a value of 0, corresponds to the block 702-1.

A root node 704-0 corresponds to the block 702. As the block 702 is split into four sub-blocks, the value of the root node 704-0 is the split bit (e.g., 1). At an intermediate level, the flags indicate whether a sub-block of the block 702 is further split into four sub-sub-blocks. In this case, a node 704-2 includes a flag of "1" because the block 702-2 is split into the blocks 702-5, 702-6, 702-7, and 702-8. Each of nodes 704-1, 704-3, and 704-4 includes a flag of "0" because the corresponding blocks are not split. As nodes 704-5, 704-6, 704-7, and 704-8 are at a bottom level of the quad-tree, no flag of "0" or "1" is necessary for these nodes. That the blocks 702-5, 702-6, 702-7, and 702-8 are not split further can be inferred from the absence of additional flags corresponding to these blocks.

The quad-tree data representation for the quad-tree 703 can be represented by the binary data of "12100," where each bit represents a node 704 of the quad-tree 703. The binary data indicates the partitioning of the block 702 to the encoder and decoder. The encoder can encode the binary data in a compressed bitstream, such as the compressed bitstream 420 of FIG. 4, in a case where the encoder needs to communicate the binary data to a decoder, such as the decoder 500 of FIG. 5.

The blocks corresponding to the leaf nodes of the quad-tree 703 can be used as the bases for prediction. That is, prediction can be performed for each of the blocks 702-1, 702-5, 702-6, 702-7, 702-8, 702-3, and 702-4, referred to herein as coding blocks. As mentioned with respect to FIG. 6, the coding block can be a luminance block or a chrominance block. It is noted that, in an example, the superblock partitioning can be determined with respect to luminance blocks. The same partition can be used with the chrominance blocks.

A prediction type (e.g., intra- or inter-prediction) is determined at the coding block (e.g., a block 702-1, 702-5, 702-6, 702-7, 702-8, 702-3, or 702-4) level. That is, a coding block is the decision point for prediction.

As mentioned above, a mode decision process (e.g., partition decision process) determines the quad-tree partition of a coding block, such as the block 702. The partition decision process calculates the RD costs of different combinations of coding parameters. That is, for example, different combinations of prediction blocks and predictions (e.g., intra-prediction, inter-prediction, etc.) are examined to determine an optimal partitioning.

As a person skilled in the art recognizes, many mode decision processes can be performed by an encoder.

Figure 8:
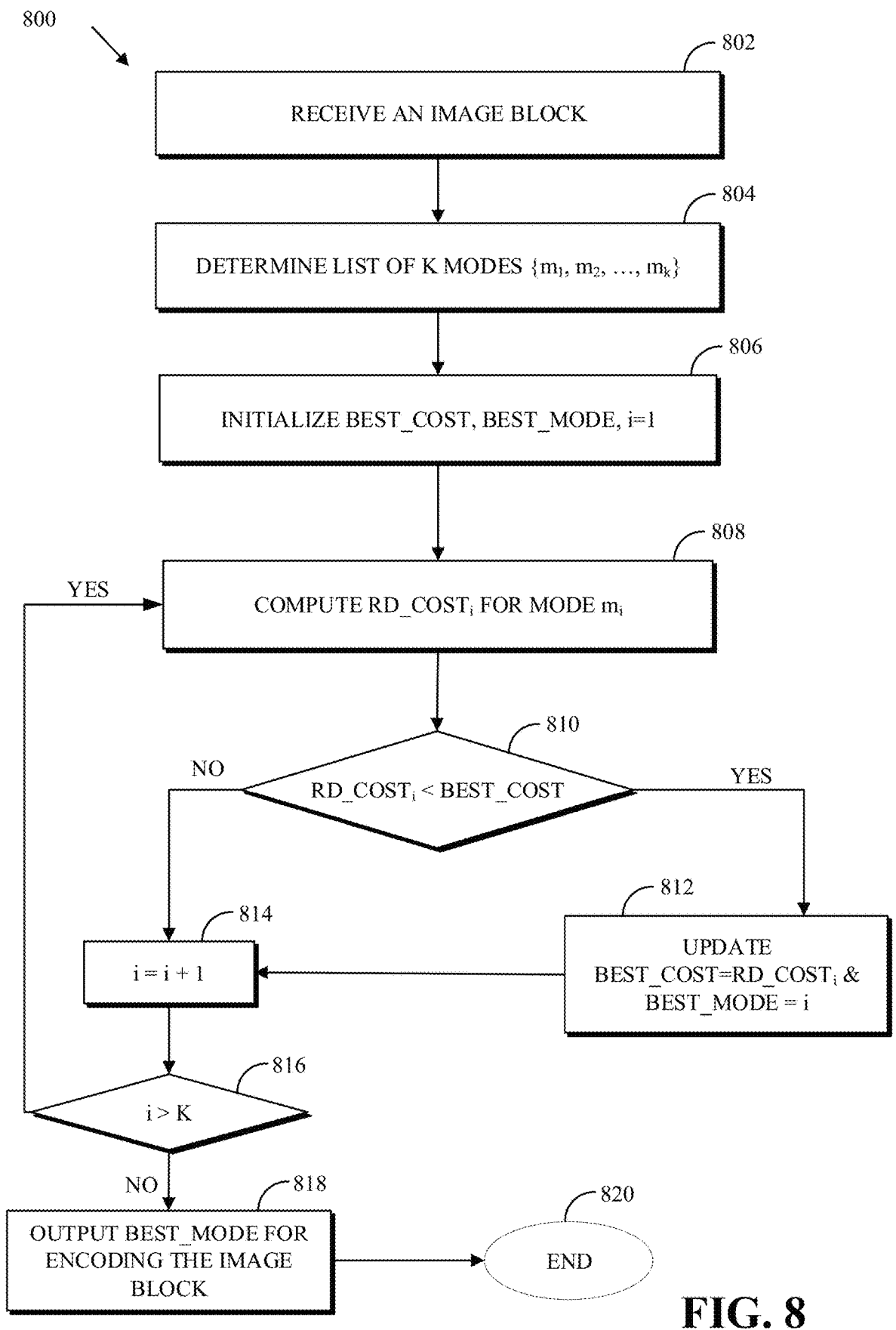
FIG. 8 is a flowchart of a process for searching for a best mode to code a block.

FIG. 8 is a flowchart of a process 800 process for searching for a best mode to code a block. The process 800 is an illustrative, high level process of a mode decision process that determines a best mode. For ease of description, the process 800 is described with respect to selecting an intra-prediction mode for encoding a prediction block. Other examples of best modes that can be determined by processes similar to the process 800 include determining a transform type, determining a transform size, and determining an interpolation filter type. The process 800 can be implemented by an encoder, such as the encoder 400 of FIG. 4, using a brute-force approach to mode decision.

At 802, the process 800 receives an image block. As the process 800 is described with respect to determining an intra-prediction mode, the image block can be a prediction unit. As described with respect to FIG. 7, each of the leaf node coding blocks (e.g., a block 702-1, 702-5, 702-6, 702-7, 702-8, 702-3, or 702-4) can be partitioned into one or more prediction units. As such, the image block can be one such prediction unit.

At 804, the process 800 determines (e.g., selects, calculates, choses, etc.) a list of modes. The list of modes can include K modes, where K is an integer number. The list of modes can be denoted $\{m_1, m_2, \ldots, m_k\}$. The encoder can have available a list of intra-prediction modes. For example, in the case of an AV1 codec, the list of available intra-prediction modes can be {DC_PRED, V_PRED, H_PRED, D45_PRED, D135_PRED, D117_PRED, D153_PRED, D207_PRED, D63_PRED, SMOOTH_PRED, SMOOTH_V_PRED, and SMOOTH_H_PRED, PAETH_PRED}. A description of these intra-prediction modes is omitted as the description in impertinent to the understanding of this disclosure. The list of modes determined at 804 can be any subset of the list of available intra-prediction modes.

At 806, the process 800 initializes a BEST_COST variable to a high value (e.g., INT_MAX, which may be equal to 2,147,483,647) and initializes a loop variable i to 1, which corresponds to the first mode to be examined.

At 808, the process 800 computes (e.g., calculates) an $RD\_COST_i$ for the $mode_i$. At 810, the process 800 tests whether the RD cost, $RD\_COST_i$ of the current mode under examination, $mode_i$ is less than the current best cost, BEST_COST. If the test is positive, then at 812, the process 800 updates the best cost to be the cost of the current mode (i.e., BEST_COST=$RD\_COST_i$) and sets the current best mode index (BEST_MODE) to the loop variable i (BEST_MODE=i). The process 800 then proceeds to 814 to increment the loop variable i (i.e., i=i+1) to prepare for examining the next mode (if any). If the test is negative, then the process 800 proceeds to 814.

At 816, if there are more modes to examine, the process 800 proceeds back to 808; otherwise the process 800 proceeds to 816. At 816, the process 800 outputs the index of the best mode, BEST_MODE. Outputting the best mode can mean returning the best mode to a caller of the process 800. Outputting the best mode can mean encoding the image using the best mode. Outputting the best mode can have other semantics. The process 800 terminates at 820.

Figure 9:
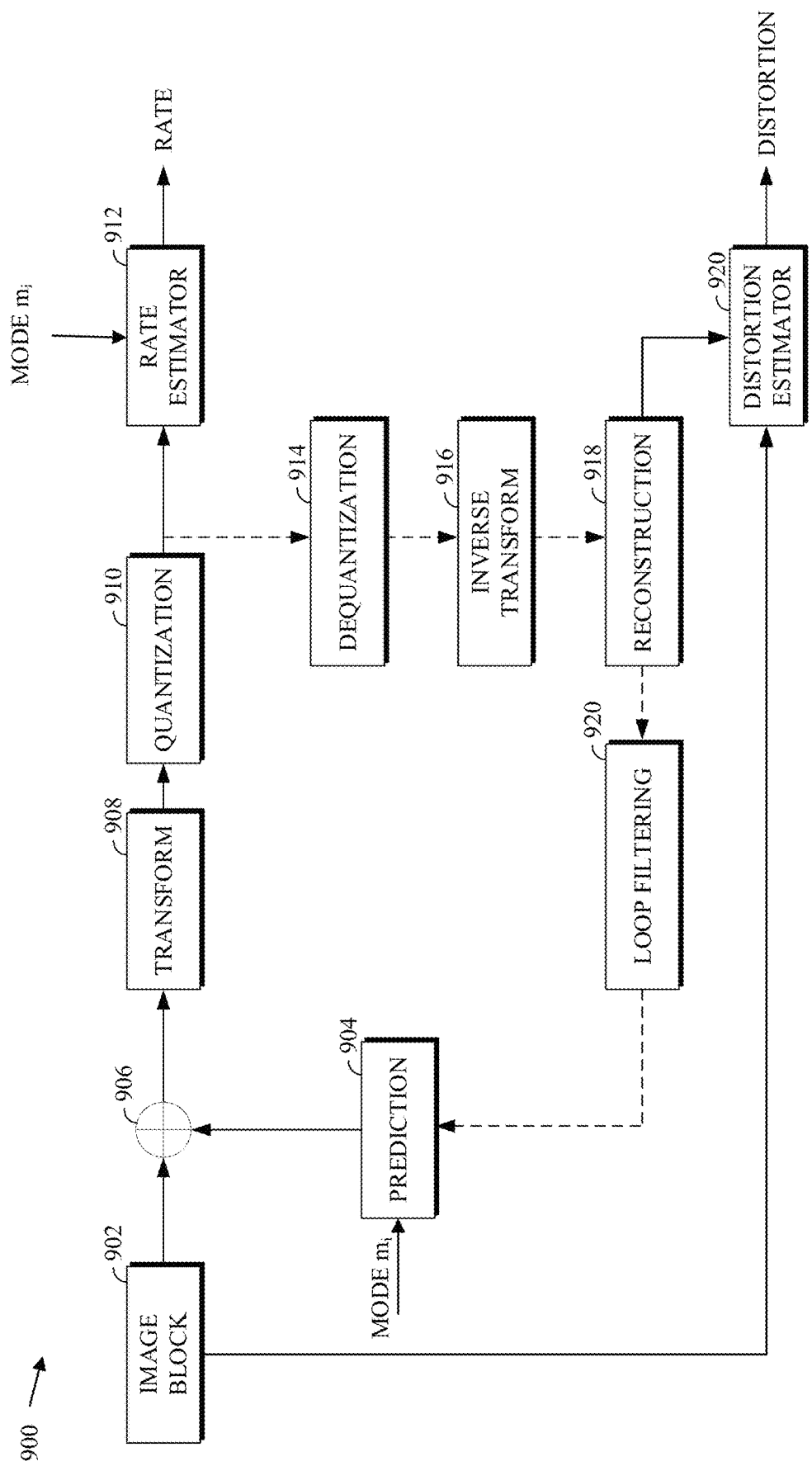
FIG. 9 is a block diagram of an example of estimating the rate and distortion costs of coding an image block by using a prediction mode.

FIG. 9 is a block diagram of an example 900 of estimating the rate and distortion costs of coding an image block X by using a prediction mode $m_i$. The process 900 can be performed by an encoder, such as the encoder 400 of FIG. 4. The process 900 includes performing a hypothetical encoding of the image block X using the prediction mode $m_i$ to determine the RD cost of encoding the block. The process 900 can be used by the process 800 at 808.

A hypothetical encoding process is a process that carries out the coding steps but does not output bits into a compressed bitstream, such as the compressed bitstream 420 of FIG. 4. Since the purpose is to estimate a rate (also referred as bit rate), a hypothetical encoding process may be regarded or called a rate estimation process. The hypothetical encoding process computes the number of bits (RATE) required to encode the image block X. The example 900 also calculates a distortion (DISTORTION) based on a difference between the image block X and a reconstructed version of the image block X.

At 904, a prediction, using the mode $m_i$, is determined. The prediction can be determined as described with respect to intra/inter-prediction stage 402 of FIG. 4. At 906, a residual is determined as a difference between the image block 902 and the prediction. At 908 and 910, the residual is transformed and quantized, such as described, respectively, with respect to the transform stage 404 and the quantization stage 406 of FIG. 4. The rate (RATE) is calculated by a rate estimator 912, which performs the hypothetical encoding. In an example, the rate estimator 912 can perform entropy encoding, such as described with respect to the entropy encoding stage 408 of FIG. 4.

The quantized residual is dequantized at 914 (such as described, for example, with respect to the dequantization stage 410 of FIG. 4), inverse transformed at 916 (such as described, for example, with respect to the inverse transform stage 412 of FIG. 4), and reconstructed at 918 (such as described, for example, with respect to the reconstruction stage 414 of FIG. 4) to generate a reconstructed block. A distortion estimator 920 calculates the distortion (i.e., the loss in video quality) between the image block X and the reconstructed block. In an example, the distortion can be a mean square error between pixel values of the image block X and the reconstructed block. The distortion can be a sum of absolute differences error between pixel values of the image block X and the reconstructed block. Any other suitable distortion measure can be used.

The rate, RATE, and distortion, DISTORTION, are then combined into a scalar value (i.e., the RD cost) by using the Lagrange multiplier as shown in formula (5)

$$\text{DISTORTION} + \lambda_{mode} \times \text{RATE}, \quad (5)$$

The Lagrange multiplier $\lambda_{mode}$ of the formula 5 can be calculated as described above, depending on the encoder performing the operations of the example 900.

FIGS. 8 and 9 illustrate that the traditional (i.e., brute-force) approach to mode decision is largely a serial process that essentially codes an image block X by using candidate modes to determine the mode with the best cost. Techniques have been used to reduce the complexity in mode decision. For example, early termination techniques have been used to terminate the loop of the process 800 of FIG. 8 as soon as certain conditions are met, such as, for example, that the rate distortion cost is lower than a threshold. Other techniques include selecting, for example based on heuristics, a subset of the available candidate modes or using multi-passes over the candidate modes. However, such techniques may not sufficiently reduce the complexity in mode decision.

Figure 10:
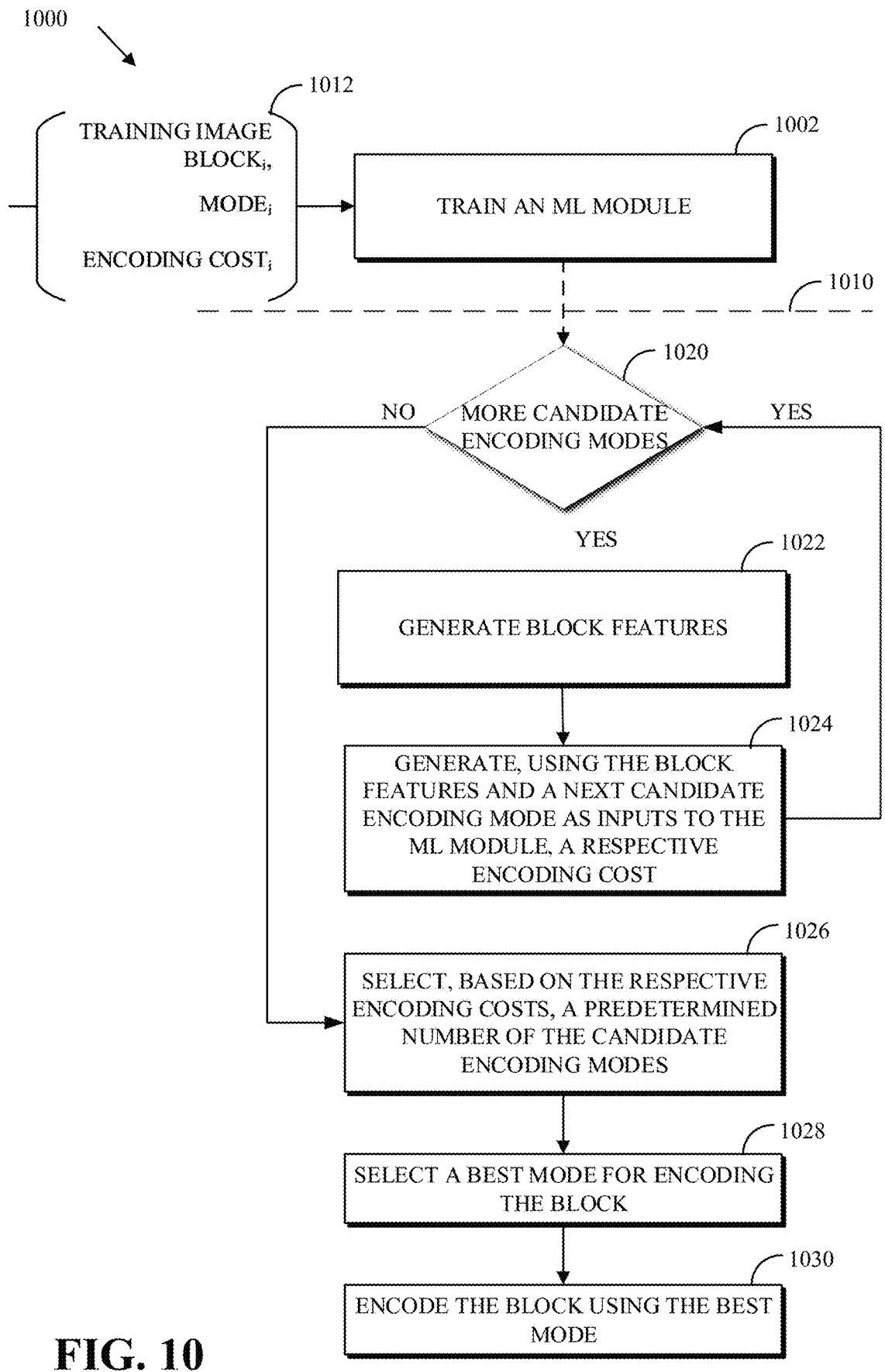
FIG. 10 is a flowchart of a process for encoding a block of a video stream according to implementations of this disclosure.

FIG. 10 is a flowchart of a process 1000 for encoding, by an encoder (i.e., a first encoder), a block of a video stream according to implementations of this disclosure. The process 1000 includes two phases: a training phase and an inference phase. For simplicity of explanation, the training and inference phases are shown as phases of one process (i.e., the process 1000). However, the training and inference phases can be separate processes.

During the training phase, the process 1000 trains, using input data, a machine-learning model to estimate (e.g., infer, calculate, output, etc.) an encoding cost of encoding a training input block using a training input encoding mode. During the inference phase, the process 1000 uses the trained machine-learning model to infer (e.g., estimates, output, etc.) an encoding cost of encoding an input block using an encoding mode (i.e., a mode).

During the training phase, the input data can include an image block (i.e., training input block) of a video stream, a mode (i.e., training input encoding mode) to be used for encoding the block, block features (as further explained below) of the block of video, more, fewer, other inputs, or a combination thereof. During the training phase, encoding costs (determined, for example, as described with respect to FIGS. 8 and 9) are used as input data. In an example, the image block can be a residual block. That is, the image block can be a block that is a difference between a source image block and a prediction block. In the case of an encoding mode that is related to a prediction block, the image block can be a block of a source frame that is co-extensive with the prediction block. In the case of an encoding mode that is related to a transform block, the image block can be a block of a source frame that is co-extensive with the transform block.

In an example, the encoding cost can include two separate values; namely, a rate and a distortion from which an RD cost can be calculated as described above. In an example, the encoding cost can include, or can be, the RD cost value itself.

In an example, the encoding mode can be related to a prediction block. A prediction block as used herein encompasses a partition of a prediction block. Examples of prediction blocks and partitions thereof are illustrated with respect to FIG. 12. As such, the encoding cost can be the cost encoding the prediction block using the encoding mode. In an example, the encoding mode can be related to inter prediction. In an example, the encoding mode can be related to intra prediction. In an example, the encoding mode can be related to a transform block. As such, the encoding cost can be the cost encoding the transform block using the encoding mode.

Which block features are calculated (e.g. generated) and used as input to the machine-learning model can depend on the encoding mode. For example, different block features can be extracted (e.g., calculated, determined, etc.) for an encoding mode related to a transform block than an encoding mode related to a prediction block. Non-limiting examples of calculated block features are provided below. All, a subset, or other block features can be used inputs.

Horizontal and vertical distribution block features: These block features can be used, for example, with an encoding mode that is related to a transform block in the selection of the transform type. These features are based on the premise that certain transform types may be more relevant (e.g., useful provide better encoding) than other transform types based on the distribution of the pixel values within the image block (e.g., the training input block). The image block can be (logically) split into sub-blocks. Each sub-block can be of size 4×4, 2×2, or any other size. In the case of a rectangular transform block, the image block can be partitioned into rectangular sub-blocks. For example, if transform block is of size 4×8, the image block can be split into four 2×4 sub-blocks.

The distribution of values in each of the sub-blocks is calculated. The distribution of values within a block is indicative of uniformity of the values within the sub-block. For example, some sub-blocks can include very large values while other sub-blocks can include very small values. In an example, the distribution value of a sub-block can be calculated as the sum of the pixel values in the sub-block. In an example, the distribution value of a sub-block can be calculated as the sum of the squared pixel values in the sub-block. Other ways of calculating the distribution value of a sub-block can be available. For example, the distribution value can be based on some other form of summation of pixel values of the input block.

In an example, the distribution can include one value for each sub-block in each of the horizontal and vertical directions. For example, given a transform block of size 4×4 and using 2×2 sub-blocks, the distribution includes 4 values for the horizontal direction and 4 values for the vertical direction, one value in each of the directions for each of the 2×2 sub-blocks. In an example, the values (i.e., the horizontal and the vertical values) of the distribution can be normalized to 1. That is, the values of distribution sum (i.e., add) to 1. As such, if all values in the transform block are the same, the distribution would be 0.25, 0.25, 0.25, 0.25.

An example of a function get_energy_distribution_fine that can be used for calculating the horizontal and vertical distribution features is given in FIGS. 13A-13B. The code listing of FIG. 13B is a continuation of the code listing of FIG. 13A.

The input parameters of the function get_energy_distribution_fine can include: cpi, bsize, src, src_stride, dst, dst_stride, and need_4th. The parameter "src" is the source image block. The parameter "src_stride" is the stride size to be used with the "src" block. The parameter "dst" is the prediction block. The parameter "dst_stride" is the stride size to be used with the "dst" block. A residual block that is the difference between the "src" and the "dst" blocks can be used as the input block to the machine learning model. The parameter "bsize" is the size of the "src" (or, equivalently, "dst") block. In an implementation, the parameter "cpi" can be used to determine whether low or high bit depth is being used. In an example, "cpi" can be used to check whether the "src" and the "dst" blocks are 8-bit, 10-bit, 12-bit, or some other bit depth. The parameter "need_4th" is an implementation detail and in some implementations can be assumed to be the Boolean value "true" or some other value that can be evaluated to the Boolean value "true."

The outputs of the function get_energy_distribution_fine are the horizontal distribution "hordist" and the vertical distribution "verdist" arrays. Each of the "hordist" and "vertdist" arrays includes a value for each sub-area of the src and/or dst blocks. For example, if the blocks are divided into 4 quadrants, then each of the "hordist" and "verdist" arrays includes 4 values corresponding to the distributions of the 4 quadrants.

Horizontal and vertical correlation block features: These features estimate the variance in the horizontal and the vertical direction within the input block. That is, a first correlation in the vertical direction and a second correlation in the vertical direction are calculated. An example of a function get_horver_correlation that can be used for calculating the horizontal and vertical correlation features is given in FIG. 14.

The input parameters of the function get_horver_correlation can include: diff, stride, w, and h. The parameter "diff" is the difference (or residual) block that is the difference between a "src" block and a "dst" block as described above. The parameter "stride" is the stride size to be used with the "diff" block. The parameters "w" and "h" are the width and height, respectively, of the "diff" block. The outputs of the function get_horver_correlation are two values: "hcorr" (corresponding to the horizontal correlation of the diff block) and "vcorr" (corresponding to the vertical correlation of the diff block).

Number of pixels and/or $\log_2$(number of pixels) block features: The number of pixels in the input block. For example, if the input block is of size M×N (e.g., 16×16), then the number of pixels is M*N (i.e., 256). Alternatively, or additionally, $\log_2$(M*N) can be used as an input. That is, if the block is 16×16, then $\log_2(256)=8$ can be used as an input.

Mean block feature: The mean pixel value of the pixels of the image block.

Variance or variance-per-pixel block features: The variance of pixels of the input block. Alternatively, or additionally, the variance-per-pixel can be used as an input feature. For example, given an input block of size M×N, the variance per pixel can be calculated as variance/(M×N). The variance-per-pixel value can be used to normalize the variance of input block. As such, irrespective of the input block size, comparable values of the variance can be used using the variance-per-pixel value.

Sum of Squared Errors (SSE) block feature: This feature sums the square errors between a source image block (i.e., the image block), or a portion thereof, and a prediction block, or a corresponding portion thereof, of the image block. The SSE can be calculated in any number of ways. For example, the SSE can be calculated for the whole block thereby providing information regarding the amount of energy in the block. As such, the SSE can be the sum of square errors of the residual block corresponding to the input block. For example, the SSE (or more accurately, multiple SSEs) can be calculated for sub-blocks. That is, the block can be divided into a number of sub-blocks (e.g., 4 quadrants) and a respective SSE can be calculated for each sub-block.

This feature can be used when determining an estimate of the encoding cost associated with a mode of encoding a transform block. Using this block feature as an input to the machine-learning model is motivated by the fact that different decisions for the transform block may be made depending on whether the SSE is high or low. For example, different transform types may be selected depending on whether one sub block, which has more error than another sub-block, which has less error, is located above, below, to the left, or to the right of the other sub-block. Different transform types provide better compression than other transform types depending on how much error there is in a sub-block and where the error is located. In an example, sub-block SSEs can be used when determining a transform type.

Mean Squared Error (MSE) block feature: The MSE is a measure of the average of the squares of the values of a residual block corresponding to the input block. Equivalently, the MSE can be calculated as the difference between the image block and a prediction block of the image block.

SAD (Sum of absolute differences) block feature: The SAD can be calculated as the sum of the absolute values of a residual block corresponding to the input block. Equivalently, the SAD can be calculated as the sum of absolute differences between the respective values of the image block and a prediction block of the image block.

SAD-per-pixel feature: Given a block of size M×N, the SAD-per-pixel can be calculated as SAD/(M*N).

SSE and/or MSE of sub-blocks block features: The image block can be partitioned into sub-blocks. For example, the image block can be partitioned into 4 (or more or less) sub-blocks. An SSE value can be calculated for each of the sub-blocks. Additionally, or alternatively, an MSE value can be calculated for each of the sub-blocks. The sub-block SSE and/or MSE values can be used as inputs to the machine-learning model.

SAD or SAD-per-pixel of sub-block block features: The image block can be partitioned into sub-blocks. For example, the image block can be partitioned into 4 (or more or less) sub-blocks. A SAD value can be calculated for each of the sub-blocks. Additionally, or alternatively, a SAD-per-pixel value can be calculated for each of the sub-blocks. The sub-block SAD and/or SAD-per-pixel values can be used as inputs to the machine-learning model.

Transform Type as a hot vector feature: The transform type is the mode for which an estimate of the encoding cost is to be learned by the machine-leaning model. As mentioned above, the machine-learning model can be a neural network. As is known, neural networks do not work very well with categorical features directly. A categorical feature means any feature that has n number of discrete values. That is, the feature is not a continuous number. For example, each of the available transform types may be associated with an index or a value. For example, the DCT transform may be associated a value 4. Instead of providing the value "4" as an input, a hot vector is created and used as input. A hot vector can be a vector of binary values whose dimension is equal to the number of the possible values (e.g., modes), has a 1 for a current value (e.g., mode) of interest, and zeros everywhere else. For example, assume that there are five possible transform types and that a current transform type for which an encoding cost is to be estimated is transform type number 4. As such, the hot vector (0, 0, 0, 1, 0) can be created and used as an input.

More generally, for any categorical mode (e.g., intra-prediction modes), the possible modes can be converted into a hot vector and only one of the values (i.e., the location of the vector corresponding to a current mode) can be set to 1 and every other location can be set to zero, As such, and as far as neural network is concerned, the neural network receives one input value for each of the values of the hot vector.

Transform width and height features: These features correspond to a mode for which an encoding cost is to be estimated. These features correspond to the size of the transform block for which the encoding cost, of encoding the transform block using the mode, is to be learned. For example, after the encoder has determined that the transform block size is M×N (transform width×transform height), the machine-learning model can be trained to learn the encoding cost of encoding the transform block using an input encoding mode.

QP and/or a function of QP (i.e., $f(QP)$) features: QP is the quantization parameter, as described above. Additionally, or alternatively, a non-linear function of the QP can also be used. The non-linear function can be an exponential or a polynomial function, depending on how the Lagrange multipliers is calculated. In the case of an AV1 codec, a polynomial function (e.g., $QP^2$) can be used. The $f(QP)$ value, such as the value $QP^2$ in the case of the AV1 codec, may provide better estimates of the encoding costs than QP. An exponential function can be used when the codec is an H264 or an HEVC encoder. For example, the non-linear function $f(Q)=c^{QP}$, where c is a constant, can be used. In an example, $c=\frac{1}{3}$.

$f(QP)$/variance-per-pixel and/or $f(QP)$/MSE features: The function of the QP, as described above, divided by the variance-per-pixel and/or the function of the QP divided by the MSE can be used as inputs to the machine-learning model.

Lagrange multiplier feature: The Lagrange multiplier, as described above, can be used as an input to the machine-learning model.

Other Rate/Distortion estimate (herein, theoretical estimate) features: Some codecs may use theoretical models to approximate the encoding cost. An example of a theoretical model may only use the SSE (i.e., a residual block) and QP to estimate the encoding cost. As such, the theoretical model does not depend, in a sufficiently meaningful way, on the data to be encoded. The encoding estimates (i.e., theoretical estimates) that are obtained using such theoretical models can also be used as inputs to the machine-learning model. Additionally, it is also noted that implementations according to this disclosure (i.e., machine-learning based estimation of encoding costs) can be used in at least some of the places within a codec that such theoretical models are used.

As mentioned above, different features can be used depending on whether an encoding cost associated with a mode related to a transform block or a prediction block is being estimated. For example, in the case of a mode related to a prediction block, the features to use can include the mean, the horizontal and vertical distribution features, the prediction block width and height, the theoretical estimates of the rate and distortion or RD cost, the horizontal and vertical distribution features, the QP, the $QP^2$, the Lagrange multiplier, SSE, SSE-per-pixel, SAD, SAD-per-pixel, SSE and/or MSE of sub-blocks, SAD or SAD-per-pixel of sub-blocks, more, fewer, other features, or a combination thereof. For example, in the case of a mode related to a transform block, the features to use can include the SSE, SAD, SAD or SAD-per-pixel of sub-blocks, SSE and/or MSE of sub-blocks features, the QP, the $QP^2$, the Lagrange multiplier, the transform size width, the transform size height, the transform type, mean, horizontal and vertical distribution features, more, fewer, other features, or a combination thereof. As such, the features to be used (i.e., calculated and used as input) can depend of the mode for which an encoding cost is to be estimated.

As is known, in the process of training a machine-learning model (such as a neural network) a loss function is used to adjust the weights within the model to reduce the error (i.e., the discrepancy between the expected and the actual outputs of the machine-learning model). A typical loss function is the mean squared error between the expected/desired output of the model and the actual output of the model. As the rate and the distortion, or the RD cost, can have very large ranges, loss functions other than the mean squared error can be used. To illustrate, assume that the range of the rate is [500, 1500]. In such a case, a mean squared error of, for example, 10 is practically negligible and may not cause the model to adjust its weights. Accordingly, loss functions that calculate the relative error as a percentage, instead calculating an absolute error, can be used. For example, a Mean Relative Error (MRE) loss function that calculates the error as (prediction−label)/(label+EPSILON) can be used, where "label" is the output of the model and EPSILON can be a very small number (e.g., EPSILON=$10^{-6}$) that is used to avoid a division by zero. For example, a Mean Custom Relative Error (MCRE) loss function that calculates the error as (prediction−label)/(label+$e^{(-label)}$) can be used, where "label" is the output of the model.

Referring now to FIG. 10, at 1002, the process 1000 trains the machine-learning (ML) model. The ML model can be trained using a training data 1012. The training data 1012 is a set of training data. Each training datum is indicated by a subscript i. Each training datum of the training data 1012 can include a video block (i.e., a training image block$_i$) that was encoded by traditional encoding methods (e.g., by a second encoder), such as described with respect to FIGS. 4 and 6-9; mode decision parameters corresponding to one or more parameters of a mode used by the second encoder for encoding the training image block$_i$; and the resulting encoding cost$_i$, as determined by the second encoder, of encoding the video block using the mode. In the training phase, parameters of the ML model are generated such that, for at least some of the training data 1012, the ML model can infer, for a training datum, the corresponding encoding cost$_i$.

During the training phase (i.e., at 1002), the ML model learns (e.g., trains, builds, derives, etc.) a mapping (i.e., a function) from inputs including an image block, features related to the image block, and an encoding mode to an encoding cost (which is also provided as an input during the training phase).

The ML model can then be used by the process 1000 during an inference phase. The inference phase includes the operations 1020-1030. A separation 1010 indicates that the training phase and the inference phase can be separated in time. As such, the inferencing phase can be performed by a first encoder and the training data 1012 can be generated by a second encoder. In an example, the first encoder and the second encoder are the same encoder. That is, the training data 1012 can be generated by the same encoder that performs the inference phase. In either case, the inference phase uses a machine-learning model that is trained as described with respect to 1002.

While not specifically shown, during the inferencing phase, the process 1000 receives an image block for which a best mode for encoding the image block in a bitstream is to be determined. The best mode can be a mode that relates to a transform block. As such, the best mode can be a transform type or a transform size. The best mode can be a mode that relates to an intra-prediction block. As such, the best mode can be an intra-prediction mode. The best mode can be a mode that relates to an inter-prediction block. As such, the best mode can be an interpolation filter type.

As mentioned above, for example, and as described with respect to FIG. 8, several modes may be possible. As such, at 1020-1024, the process 1000 estimates a respective encoding cost for at least a subset of the possible modes. The modes of the at least the subset of the possible modes are referred herein to as candidate encoding modes.

At 1020, if there are more candidate encoding modes for which respective encoding costs have not been estimated, then a candidate encoding mode of the remaining candidate encoding modes is selected and the process 1000 proceeds to 1022; otherwise, the process 1000 proceeds to 1026.

At 1022, the process 1000 generates (e.g., calculates, selects, determines, etc.) block features for the image block. The image block is block for which a best encoding mode is to be determined. As such, and as described above, the features can depend on the mode to be determined. While not specifically shown in FIG. 10, some features and/or inputs to the machine learning model may be invariant to (i.e., independent of) of the encoding modes. Such features may be generated once before the operation 1020.

At 1024, the process 1000 generates, using the block features and the candidate encoding mode as inputs to the machine-learning model (i.e., machine-learning module), a respective encoding cost. The machine-learning model is the model that is trained as described with respect to 1002.

In an example, the encoding cost includes a rate value and a distortion value. As such, an RD cost can be calculated from the rate value and the distortion value as described above. In an example, the encoding cost includes an RD cost value.

At 1026, the process 1000 selects, based on the respective encoding costs, a predetermined number of the candidate encoding modes. In an example, the predetermined number of the candidate encoding modes can be 1. As such, the process 1000 selects the candidate mode that corresponds to the best RD cost. In an example, the predetermined number, n, of the candidate encoding modes can be greater than 1. As such, the process 1000 selects the n candidate encoding modes corresponding to the best n encoding costs amongst all the candidate encoding modes.

At 1028, the process 1000 selects, based on the respective encoding costs of the at least some encoding modes, a best mode for encoding the block. In the case that the predetermined number of the candidate encoding modes is 1, the process 1000 selects the candidate mode that corresponds to the best RD cost. In the case that the predetermined number of the candidate encoding modes is greater than 1, then for each of the n selected candidate encoding modes, the process 1000 can perform encoding of the block according to the n selected candidate encoding modes to determine the best mode. For example, the best mode can be selected as described with respect to FIG. 8 where the n selected candidate encoding modes can be the list of modes that is determined at 804 of FIG. 8.

At 1030, the process 1000 encodes, in a compressed bitstream, the block using the best mode.

In an aspect, a decoder, such as the decoder 500 of FIG. 5, receives the compressed bitstream. The decoder decodes the block from the compressed bitstream. As such, the decoder decodes, from the compressed bitstream, the block using a decoding mode that is encoded in the compressed bitstream by an encoder. The encoder may have encoded the decoding mode in the compressed bitstream as described with respect to at least some of 1020-1030 of FIG. 10.

Figure 11:
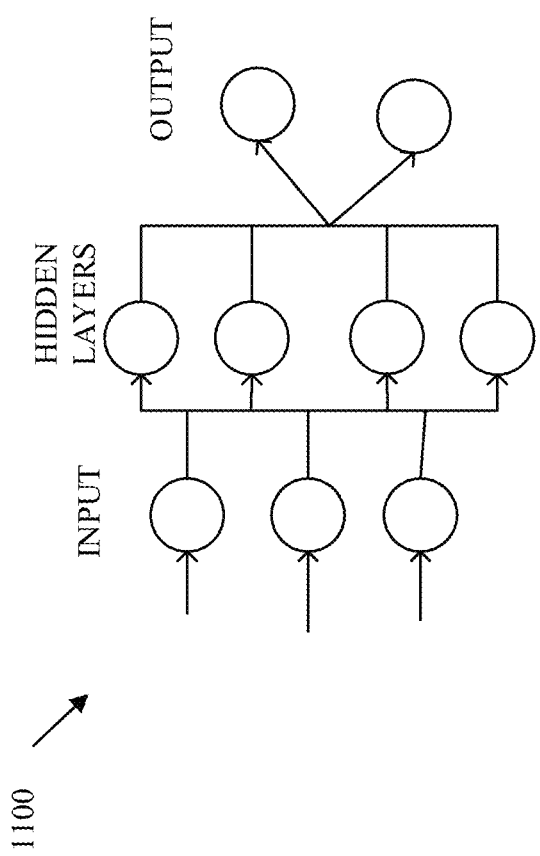
FIG. 11 is a block diagram of an example of a neural network according to implementations of this disclosure according to implementations of this disclosure.

FIG. 11 is a block diagram of an example of a neural network 1100 according to implementations of this disclosure. The neural network 1100 can embody the machine-learning model described herein. The neural network 1100 includes an input layer. The input layer can receive at least some of the features (e.g., block features) described above.

The neural network 1100 includes one or more hidden layers. In an example, the neural network 1100 includes one hidden layer. In an example, the hidden layer includes 48 nodes. In another example, the hidden layer includes 64 nodes. The neural network 1100 is shown as including 2 output nodes corresponding to a rate value and a distortion value. As mentioned above the output layer can include one node only, corresponding to the RD cost. The rate can be a value that can be represented by 32 bits. That is, the rate is a 32-bit integer. The distortion and the RD cost can each be a 64-bit integer.

In an example, the input layer can also receive the image block. In an example, and in the case of determining an estimate for an intra-prediction mode, the input layer can also receive neighboring pixel values (also known as top and left peripheral neighboring values). In an example, the neural network 1100 can include one or more convolution operations that extract features from the image block and/or the neighboring pixel values.

Figure 12:
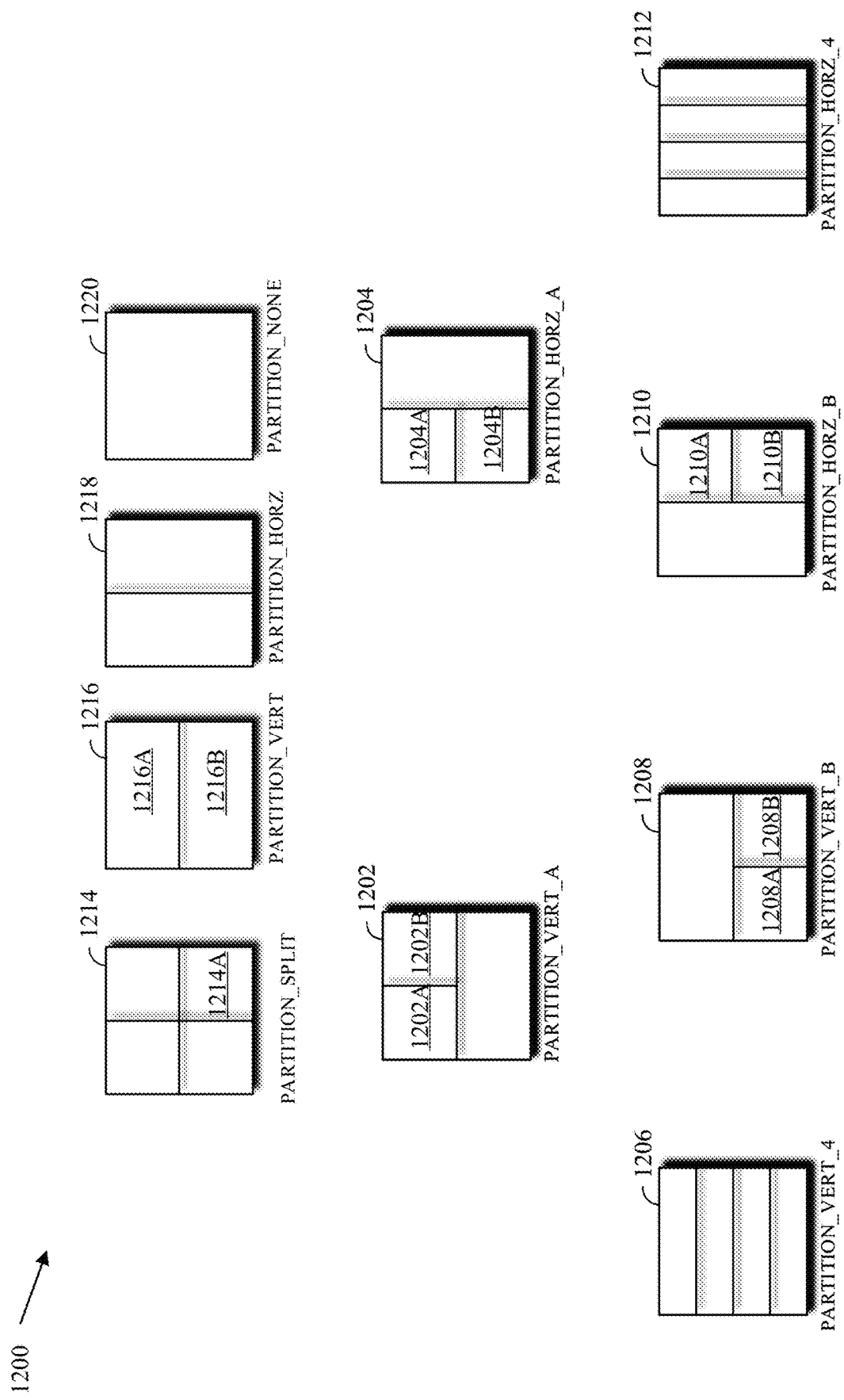
FIG. 12 is an example of partitions of a block.

FIG. 12 is an example 1200 of partitions of a block. Some encoders may partition a superblock, such as a super-block of size 64×64, 128×128, or any other size, of a square sub-block of the superblock, into one of the partitions of the example 1200.

A partition type 1202 (which may be referred to as the PARTITION_VERT_A) splits an N×M coding block into two horizontally adjacent square blocks, each of size N/2×N/2, and a rectangular prediction unit of size N×N/2. A partition type 1208 (which may be referred to as the PARTITION_VERT_B) splits an N×N coding block into a rectangular prediction unit of size N×N/2 and two horizontally adjacent square blocks, each of size N/2×N/2.

A partition type 1204 (which may be referred to as the PARTITION_HORZ_A) splits an N×M coding block into two vertically adjacent square blocks, each of size N/2×N/2, and a rectangular prediction unit of size N/2×N. A partition type 1210 (which may be referred to as the PARTITION_HORZ_B) splits an N×M coding block into a rectangular prediction unit of size N/2×N and two vertically adjacent square blocks, each of size N/2×N/2.

A partition type 1206 (which may be referred to as the PARTITION_VERT_4) splits an N×N coding block into four vertically adjacent rectangular blocks, each of size N×N/4. A partition type 1212 (which may be referred to as the PARTITION_HORZ_4) splits an N×N coding block into four horizontally adjacent rectangular blocks, each of size N/4×N.

As is known, other partition types can be used by a codec. The example 1200 illustrates four partition types that may be available at an encoder. A partition type 1214 (also referred to herein as the PARTITION_SPLIT partition type and partition-split partition type) splits an N×M coding block into four equally sized square sub-blocks. For example, if the coding block 1214 is of size N×M, then each of the four sub-blocks of the PARTITION_SPLIT partition type, such as a sub-block 1214A, is of size N/4×N/4.

A partition type 1216 (also referred to herein as the PARTITION_VERT partition type) splits the coding block into two adjacent rectangular prediction units, each of size N×N/2. A partition type 1218 (also referred to herein as the PARTITION_HORZ partition type) splits the coding block into two adjacent rectangular prediction units, each of size N/2×N. A partition type 1220 (also referred to herein as the PARTITION_NONE partition type and partition-none partition type) uses one prediction unit for the coding block such that the prediction unit has the same size (i.e., N×N) as the coding block.

The partition types 1214-1220 may be referred to as basic partition types and the partitions 1202-1212 may be referred to as extended partition types.

For simplicity of explanation, the processes 800 and 1000 are each depicted and described as a series of blocks, steps, or operations. However, the blocks, steps, or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The aspects of encoding and decoding described above illustrate some encoding and decoding techniques. However, it is to be understood that "encoding" and "decoding," as those terms are used in the claims, could mean compression, decompression, transformation, or any other processing or change of data.

The words "example" or "implementation" are used herein to mean serving as an example, instance, or illustration. Any aspect or design described herein as "example" or "implementation" is not necessarily to be construed as being preferred or advantageous over other aspects or designs. Rather, use of the words "example" or "implementation" is intended to present concepts in a concrete fashion. As used in this application, the term "or" is intended to mean an inclusive "or" rather than an exclusive "or." That is, unless specified otherwise or clearly indicated otherwise by the context, "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form. Moreover, use of the term "an implementation" or "one implementation" throughout is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general-purpose computer or general-purpose processor with a computer program that, when executed, carries out any of the respective methods, algorithms, and/or instructions described herein. In addition, or alternatively, for example, a special-purpose computer/processor, which can contain other hardware for carrying out any of the methods, algorithms, or instructions described herein, can be utilized.

The transmitting station 102 and the receiving station 106 can, for example, be implemented on computers in a video conferencing system. Alternatively, the transmitting station 102 can be implemented on a server, and the receiving station 106 can be implemented on a device separate from the server, such as a handheld communications device. In this instance, the transmitting station 102, using an encoder 400, can encode content into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other transmitting station 102 and receiving station 106 implementation schemes are available. For example, the receiving station 106 can be a generally stationary personal computer rather than a portable communications device, and/or a device including an encoder 400 may also include a decoder 500.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method for encoding a block of a video stream, comprising:
generating, using pixel values of the block, block features for the block; for each candidate encoding mode of candidate encoding modes,
generating, using the block features and the each candidate encoding mode as inputs to a neural network, a respective encoding cost, wherein the neural network is trained to output the respective encoding cost for the candidate encoding mode,
wherein the candidate encoding modes includes at least one of interprediction modes, intra-prediction modes, interpolation filter types, or transform types;
selecting, using the respective encoding costs, a predetermined number of the candidate
encoding modes corresponding to a best predetermined number of the respective encoding costs; encoding the block using the predetermined number of the candidate encoding modes to obtain a best mode for encoding the block; and
encoding, in a compressed bitstream, the block using the best mode.

2. The method of claim 1, wherein the is trained to:
receive features of an input block to be encoded;
receive an encoding mode; and
output, without performing an encoding of the input block using the encoding mode, an encoding cost indicative of the encoding of the input block using the encoding mode.

3. The method of claim 1, wherein the respective encoding cost comprises a rate-distortion (RD) cost value.

4. The method of claim 1, wherein the respective encoding cost comprises a rate value and a distortion value.

5. An apparatus for encoding a block of a video stream, comprising: a memory; and
a processor, the processor configured to execute instructions stored in the memory to: generate, using pixel values of the block, block features for the block;
for each candidate encoding mode of candidate encoding modes,
generate, using the block features and the each candidate encoding mode, a respective encoding cost by instructions to:
use the block features and the each candidate encoding mode as inputs to a machine-learning model to generate the respective encoding cost, wherein the machine-learning model is trained to:
receive features of an input block to be encoded; receive an encoding mode; and
output, without performing an encoding of the input block using the encoding mode, an encoding cost indicative of the encoding of the input block using the encoding mode,
wherein on a first condition that the candidate encodina modes are inter prediction modes, the each candidate encodina mode is an inter prediction mode,
on a second condition that the candidate encoding modes are intra-prediction modes, the each candidate encoding mode is an intra-prediction mode,
on a third condition that the candidate encodina modes are interoolation filter types, the each candidate encodina mode is an interoolation filter type, and on a fourth condition that the candidate encoding modes are transform types, the each candidate encoding mode is a transform type;

select, based on the respective encoding costs of the at least some encoding modes, a best mode for encoding the block; and encode, in a compressed bitstream, the block using the best mode.

6. The apparatus of claim 5, wherein to select, based on the respective encoding costs of the at least some encoding modes, the best mode for encoding the block comprises to:

select a subset of the candidate encoding modes, the subset corresponding to a best predetermined number of the respective encoding costs;

determine respective true encoding costs of each candidate encoding mode of the subset of the candidate encoding modes; and select, as the best mode, a candidate encoding mode of the subset of the candidate encoding modes corresponding to a lowest true encoding cost of the true encoding costs.

7. The apparatus of claim 5, wherein the respective encoding cost comprises a rate-distortion (RD) cost value.

8. The apparatus of claim 5, wherein the respective encoding cost comprises a rate value and a distortion value.

9. The apparatus of claim 5, wherein the best mode corresponds to a lowest encoding cost of the respective encoding costs.

10. An apparatus for decoding a block of a video stream, comprising: a memory; and a processor, the processor configured to execute instructions stored in the memory to: decode, from a compressed bitstream, the block using a decoding mode that is encoded in the compressed bitstream by an encoder, wherein the encoder encoded the decoding mode in the compressed bitstream by instructions including instructions to:

generate, using pixel values of a source block, block features for the source block;

for each candidate encoding mode of candidate encoding modes, generate, using the block features and the each candidate encoding mode, a respective encoding cost, wherein to generate the respective encoding cost by the encoder comprises to:

use the block features and the each candidate encoding mode as inputs to a machine-learning model to generate the respective encoding cost, wherein the machine-learning model is trained to:

receive features of an input block to be encoded;

receive an encoding mode; and output, without performing an encoding of the input block using the encoding mode, an encoding cost indicative of the encoding of the input block using the encoding mode, wherein the candidate encoding modes includes at least one of inter prediction modes, intra-prediction modes, transform types, or interolation filter types;

select, based on the respective encoding costs, a predetermined number of the candidate encoding modes;

select, based on the respective encoding costs of the at least some encoding modes, a best mode for encoding the source block; and encode, in the compressed bitstream, the source block using the best mode.

11. The apparatus of claim 10, wherein to select, based on the respective encoding costs of the at least some encoding modes, the best mode for encoding the source block comprises to:

encode, to obtain respective real encoding costs, the block using the candidate encoding modes corresponding to a best predetermined number of the respective encoding modes; and select, as the best mode, a candidate encoding mode corresponding to a lowest true encoding cost of the respective real encoding costs.

* * * * *